(12) United States Patent  
Wesley

(10) Patent No.: US 10,248,720 B1
(45) Date of Patent: Apr. 2, 2019

(54) SYSTEMS AND METHODS FOR PREPARING RAW DATA FOR USE IN DATA VISUALIZATIONS

(71) Applicant: Tableau Software, Inc., Seattle, WA (US)

(72) Inventor: Richard Wesley, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 669 days.

(21) Appl. No.: 14/801,748

(22) Filed: Jul. 16, 2015

(51) Int. Cl.
*G06F 17/30* (2006.01)

(52) U.S. Cl.
CPC .. *G06F 17/30716* (2013.01); *G06F 17/30713* (2013.01)

(58) Field of Classification Search
CPC ................................................ G06F 17/30716
USPC ......................................................... 707/736
See application file for complete search history.

(56) References Cited

U.S. PATENT DOCUMENTS

| | | | | |
|---|---|---|---|---|
| 6,718,336 B1* | 4/2004 | Saffer | ............... | G06F 17/30557 |
| 7,800,613 B2* | 9/2010 | Hanrahan | ............. | G06T 11/206 |
| | | | | 345/440 |
| 7,882,144 B1* | 2/2011 | Stolte | ............... | G06F 17/30592 |
| | | | | 707/802 |
| 2005/0060324 A1* | 3/2005 | Johnson | ................. | G06Q 30/06 |
| | | | | 707/999.1 |
| 2006/0259509 A1* | 11/2006 | Stolte | ............... | G06F 17/30592 |
| | | | | 707/102 |
| 2007/0061611 A1* | 3/2007 | Mackinlay | ........ | G06F 17/30554 |
| | | | | 714/5.1 |
| 2007/0078872 A1* | 4/2007 | Cohen | ............... | G06F 17/30696 |
| 2009/0024639 A1* | 1/2009 | Steinmann | ........ | G06F 17/30557 |
| | | | | 707/100 |
| 2010/0312747 A1* | 12/2010 | Stolte | ............... | G06F 17/30554 |
| | | | | 707/602 |
| 2011/0153667 A1* | 6/2011 | Parmenter | ......... | G06F 17/30371 |
| | | | | 707/780 |
| 2015/0040048 A1* | 2/2015 | George | ................. | G06Q 30/02 |
| | | | | 715/769 |

\* cited by examiner

*Primary Examiner* — Pierre M Vital
*Assistant Examiner* — Andrew N Ho
(74) *Attorney, Agent, or Firm* — Morgan, Lewis & Bockius LLP

(57) ABSTRACT

Systems and methods for preparing raw data for use in data visualizations are described herein. A method includes selecting a sample of data values from an existing data column in a data source, identifying a first delimiting location within the sample, creating first and second new data values by splitting each data value in the existing data column at the first identified delimiting location, storing the first and second new data values in first and second new data columns, respectively, and assigning field names to the first and second new data columns. The method also includes displaying a schema information region, which includes the assigned field names, in a data visualization user interface. The method displays a data visualization that includes first and/or second new data values based on user selection of the assigned field names of the first or second new data columns.

28 Claims, 14 Drawing Sheets

Raw Data Source 404

|   | Date #1 | Amount ($) | Date Approved |
|---|---------|------------|---------------|
| 1 | Date #1 | Amount ($) | Date Approved |
| 2 | 01012001 | 105 | 01122001 |
| 3 | 10112012 | 500.15 | 10152012 |
| 4 | 09091976 | 400 | 09121976 |
| 5 | 090904 | 27.65 | 091004 |
| 6 | 03092004 | 27.65 | 03122004 |
| 7 | 08082014 | 27.65 | 081214 |
| 8 | 09152013 | 27.65 | 092013 |
| 9 | 02972001 | 27.65 | 02112001 |

414-1, 414-2, 414-3
404-1, 404-2, 404-3
Expenses

Figure 4C

Prepped Data Source 406

|   | Date #1 | Prepped Date #1 | Amount ($) | Date Approved |
|---|---------|-----------------|------------|---------------|
| 1 | Date #1 | Prepped Date #1 | Amount ($) | Date Approved |
| 2 | 01012001 | 01/01/2001 | 105 | 01122001 |
| 3 | 10112012 | 10/11/2012 | 500.15 | 10152012 |
| 4 | 09091976 | 09/09/1976 | 400 | 09121976 |
| 5 | 090904 | 09/09/2004 | 27.65 | 091004 |
| 6 | 03092004 | 03/09/2004 | 27.65 | 03122004 |
| 7 | 08082014 | 08/08/2014 | 27.65 | 081214 |
| 8 | 09152013 | 09/15/2013 | 27.65 | 092013 |
| 9 | 02972001 | 02/07/2001 | 27.65 | 02112001 |

416-1, 416-2, 416-3, 416-4
406-1, 406-2, 406-3
Prepped Expenses

Figure 4D

Raw Data Source 408

408-1

|   | A | B | C | D |
|---|---|---|---|---|
| 1 | 01 | 20 | 1999 | $23 |
| 2 | 02 | 11 | 1987 | $500.12 |
| 3 | 12 | 03 | 2011 | $500.12 |
| 4 | 11 | 04 | 1997 | $5.12 |
| 5 | 09 | .07 | 1988 | $12.87 |
| 6 | 01 | 17 | 1976 | $20.12 |
| 7 | 02 | 23 | 2014 | $500.12 |
| 8 | 08 | 28 | 2013 | $9.12 |
| 9 | 04 | 12 | 2010 | $99.09 |

418-1, 418-2, 418-3, 418-4

Expenses

Figure 4E

Prepped Data Source 410

410-1

|   | Month | Day | Year | Expense Date | Amount |
|---|---|---|---|---|---|
| 1 | 01 | 20 | 1999 | 01/20/1999 | $23 |
| 2 | 02 | 11 | 1987 | 02/11/1987 | $500.12 |
| 3 | 12 | 03 | 2011 | 12/03/2011 | $500.12 |
| 4 | 11 | 04 | 1997 | 11/04/1997 | $5.12 |
| 5 | 09 | .07 | 1988 | 09/07/1988 | $12.87 |
| 6 | 01 | 17 | 1976 | 01/17/1976 | $20.12 |
| 7 | 02 | 23 | 2014 | 02/23/2014 | $500.12 |
| 8 | 08 | 28 | 2013 | 03/28/2013 | $9.12 |
| 9 | 04 | 12 | 2010 | 04/12/2010 | $99.09 |

420-1, 420-2, 420-3, 420-4, 420-5

Prepped Expenses

Figure 4F

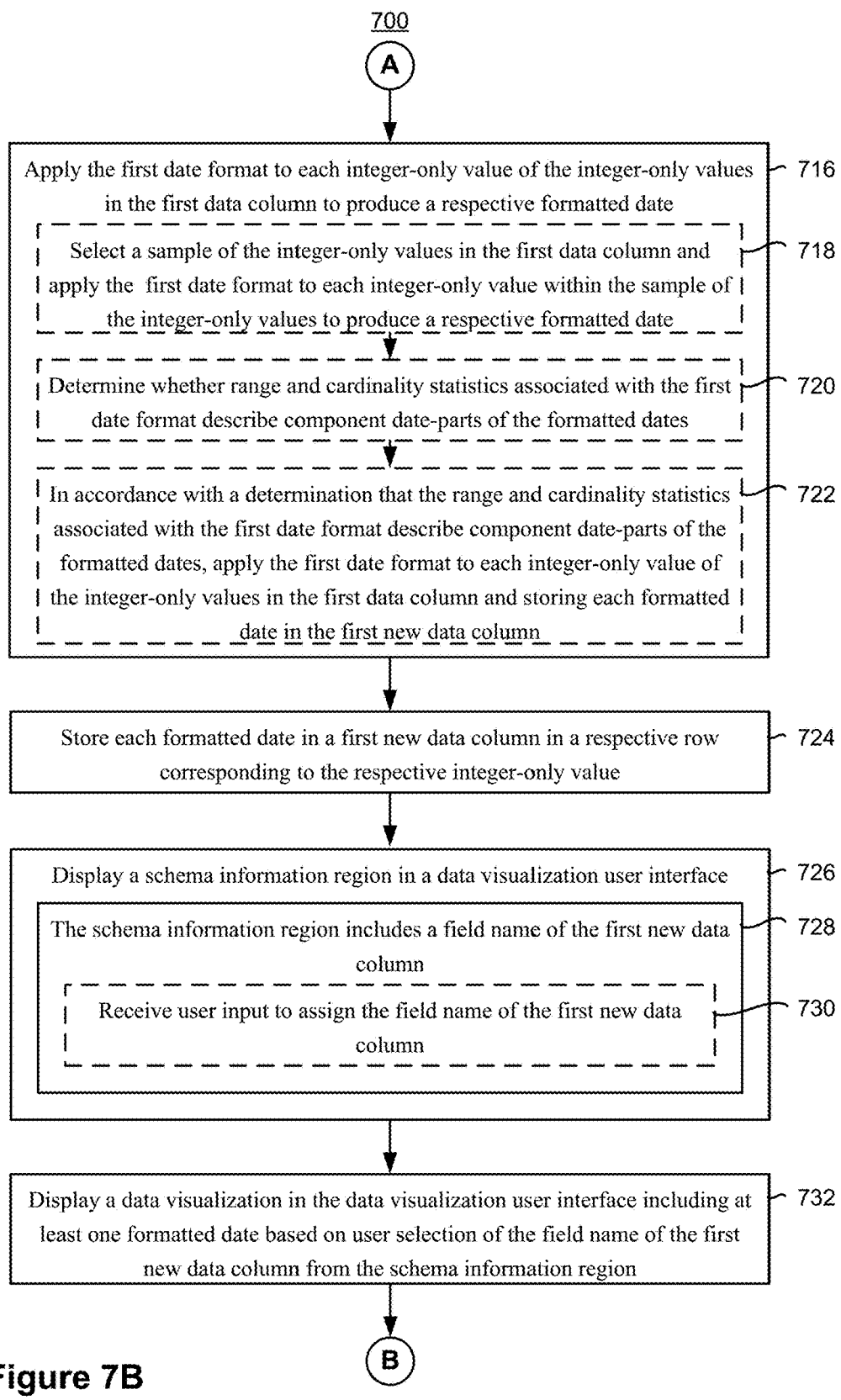

SYSTEMS AND METHODS FOR PREPARING RAW DATA FOR USE IN DATA VISUALIZATIONS

TECHNICAL FIELD

The disclosed implementations relate generally to data visualization and more specifically to systems, methods, and user interfaces for preparing raw data for use in data visualizations.

BACKGROUND

Data visualizations are an effective way to communicate, analyze, and understand a large amount of data (sometimes "big data"). Data visualization applications enable a user to understand a data set visually, including distribution, trends, outliers, and other factors that are important to making business decisions. Some data sets are very large or complex, and many data sets contain raw, unformatted data that cannot be used in a meaningful way in data visualizations without further processing.

Some applications allow users to build and execute numerous complex calculations or design and build external programs for formatting raw data. Building calculations and external programs typically requires additional training. Even after this additional training, users often produce calculations and external programs that contain syntax errors or are otherwise unable to properly prepare raw data for use in data visualizations.

SUMMARY

Disclosed implementations address the above deficiencies and other problems associated with preparing raw data for use in data visualizations.

Some implementations simplify the complexities and additional learning involved with having to build and execute custom calculations or external programs for preparing raw data for use in data visualizations. In some implementations, a data visualization application automatically identifies raw data within one or more columns of data in an imported data set. For example, a column whose data values contain multiple distinct pieces of data (e.g., first name, user ID, address information, date of birth) can be automatically identified by the data visualization application as requiring further processing. By sampling data values within the column, delimiting locations (e.g., locations between each of the multiple distinct pieces of data, such as consistently-occurring delimiters) can be identified and used to split the data values into the distinct piece of data. In this way, raw data is prepared for use in data visualizations, without requiring any user input.

Thus, disclosed implementations herein make the potentially complex process of preparing raw data for use in data visualizations into a straightforward and intuitive process. Users are able to use the disclosed implementations to prepare data for use in data visualizations in order to produce better, more meaningful, more detailed, and more accurate data visualizations. This enables users to make better and more informed business decisions.

In accordance with some implementations, a method of preparing data for use in data visualizations executes at a computing device having one or more processors and memory storing one or more programs configured for execution by the one or more processors. For example, the computing device can be a smart phone, a tablet, a notebook computer, a desktop computer, a server computer, or any other computing device. The method selects a sample of data values from an existing data column (also referred to as a data field) in a data source (also referred to as a dataset). In some implementations, the sample includes a plurality of distinct data values.

The method also identifies a first delimiting location within the sample of data values. For example, the method may identify that each data value within the sample of data values contains the symbol ","). The method creates first new data values and second new data values by splitting each data value in the existing data column at the first identified delimiting location. For example, if a data value is "Last, First," then splitting this data value at the first identified delimiting location of "," produces two data values: (i) "Last" and (ii) "First." The method stores the first new data values in a first new data column and stores the second new data values in a second new data column. For example, the method stores "Last" in the first new data column and stores "First" in the second new data column. In some implementations, the method then assigns field names to the first and second new data columns.

In some implementations, the method displays a schema information region in a data visualization user interface. The schema information region includes the assigned field names of the first and second new data columns. In some implementations, the method also displays a data visualization in the data visualization user interface including one or more first new data values based on user selection of the assigned field name of the first new data column from the schema information region and/or displaying the data visualization in the data visualization user interface including one or more second new data values based on user selection of the assigned field name of the second new data column from the schema information region. In other words, the user selects the field name associated with the first or the second new data column (or both) and creates a data visualization that includes one or more of the data values contained within the selected data columns.

In some implementations, identifying the first delimiting location includes identifying a plurality of delimiting locations that includes the first delimiting location. In these implementations, each data value in the existing data column is split at the first delimiting location and at the other delimiting locations in the plurality of delimiting locations. In this way, each data value is parsed to produce individual data values that are ready for use in data visualizations.

In some implementations, identifying the plurality of delimiting locations includes generating statistics describing occurrence of consistent delimiters within the sample of data values.

In some implementations, the consistent delimiters comprise one or more non-alphanumeric characters that occur in a same sequence in a substantial majority of the sample of data values (e.g., 80%, 90%, or 95% of the sample).

In some implementations, the method assigns a first data type to the first new data column and a second data type to the second new data column. In some implementations, the first data type is distinct from the second data type.

In some implementations, the first data type is a date (or a datetime) data type and the method looks at each first new data value in the first new data column to identify component date-parts using range and cardinality statistics.

In some implementations, assigning field names to the first and second new data columns includes receiving user input to assign field names to the first and second new data columns.

In some implementations, assigning field names to the first and second new data columns includes automatically assigning default field names to the first and second new data columns based on metadata associated with the first and second new data values, respectively.

Some implementations simplify the process for preparing date fields for use in data visualizations. In some instances, data representing a date is stored in a non-native date format, such as a single character string, as a single integer, or as a set of three numeric or character fields representing month, day, and year. For ease of use within a data visualization application, it is useful to construct an actual "date" field in the native format of the database using the raw data. Such a date field is sometimes referred to as a date scalar, and is typically stored internally in Julian days (e.g., the number of days since January 1, 4713 BC). Disclosed implementations provide various ways to build the date fields based on how the raw data is formatted. As used herein, the term "unformatted date" refers to raw data in one or more fields in a data source that represent dates when the raw data is not stored in the native date format of the database. The term "formatted date" refers to a date field in a database that uses the native date format for the database.

Some implementations include a data visualization user interface within a data visualization application that allows users to identify a column within a data source as containing unformatted dates. The data visualization application is able to match maximum and minimum values associated with various date formats to a range of values stored in the selected column. In this way, the data visualization application is able to determine an appropriate date format for the unformatted dates and to apply that date format to produce formatted dates that can be used in data visualizations.

Thus, disclosed implementations herein make the potentially complex process of preparing raw data for use in data visualizations into a straightforward and intuitive process. Users are able to use the disclosed implementations to prepare more data (e.g., date-related information) for use in data visualizations in order to produce better and more accurate data visualizations. This enables users to make better and more informed business decisions.

In accordance with some implementations, a method of preparing data for use in data visualizations executes at a computing device having one or more processors and memory storing one or more programs configured for execution by the one or more processors. For example, the computing device can be a smart phone, a tablet, a notebook computer, a desktop computer, a server computer, or any other computing device. The method receives a first indication from a user that a first data column within a data source contains integer-only values representing unformatted dates and determines a minimum value and a maximum value of the integer-only values in the first data column. In some instances, the minimum and maximum values are already stored as metadata for the first data column and thus the method accesses this stored information.

The method matches the integer-only values in the first data column to a first date format based on a determination that a range of values associated with the first date format includes the minimum value and the maximum value of the integer-only values in the first data column. The method applies the first date format to each integer-only value of the integer-only values in the first data column to produce a respective formatted date and stores each formatted date in a first new data column in a respective row corresponding to the respective integer-only value. For example, if a particular integer-only value is stored in the fifth row of the first data column then, after applying the first date format to the particular integer-only value to produce a respective formatted date, the respective formatted data is stored in the fifth row of the first new data column.

In some implementations, the method displays a schema information region in a data visualization user interface. In some implementations, the schema information region includes a field name of the first new data column. The method may display a data visualization in the data visualization user interface including at least one formatted date based on user selection of the field name of the first new data column from the schema information region.

In some implementations, applying the first date format to each integer-only value of the integer-only values in the first data column includes: (i) selecting a sample of the integer-only values in the first data column and applying the first date format to each integer-only value within the sample of the integer-only values to produce a respective formatted date; determining whether range and cardinality statistics associated with the first date format describe component date-parts of the formatted dates; and (ii) in accordance with a determination that the range and cardinality statistics associated with the first date format describe component date-parts of the formatted dates, applying the first date format to each integer-only value of the integer-only values in the first data column and storing each formatted date in the first new data column.

In some implementations, the method includes: receiving a second indication that a second data column within the data source contains integer-only values representing unformatted dates. In some implementations, the method includes: applying the first date format to each integer-only value of the integer-only values in the second data column to produce a respective formatted date and storing each formatted date in a second new data column.

In some implementations, applying the first date format to each integer-only value of the integer-only values in the second data column includes: determining a minimum value and a maximum value of the integer-only values in the second data column; and in accordance with a determination that the range of values associated with the first date format includes the minimum value and the maximum value of the integer-only values in the second data column, applying the first date format to each integer-only value of the integer-only values in the second data column to produce a respective formatted date.

In some implementations, the first and second indications are received by the computing device at substantially the same time. For example, the user tags two fields in the user interface and clicks a button to initiate a process for both of the fields.

In some implementations, the method also receives user input to assign the field name of the first new data column.

In some implementations, before applying the first date format to each integer-only value of the integer-only values in the first data column, the method converts the value to a character string.

In some implementations, the method automatically creates a custom calculation in the data visualization user interface whose formula includes the first date format.

Thus methods, systems, and graphical user interfaces are provided that enable users to easily and intuitively prepare raw data for use in data visualizations.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

FIGS. 4A-4F illustrate original and prepped data sources (e.g., before and after views, respectively, of data sources that have been prepared for use in data visualizations) in accordance with some implementations.

FIGS. 7A-7C provide a flow diagram for a process, performed at a computing device, of preparing raw data for use in data visualizations in accordance with some implementations. Some implementations combine some of the processes or operations in FIGS. 6A-6B with some of the processes or operations in FIGS. 7A-7C.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Disclosed implementations make the potentially complex process of preparing raw data for use in data visualizations into a straightforward and intuitive process. Therefore, users are able to use the disclosed implementations to prepare more data for use in data visualizations. This results in better, more meaningful, more detailed, and more accurate data visualizations, which can be used to make better and more informed business decisions.

Figure 1:
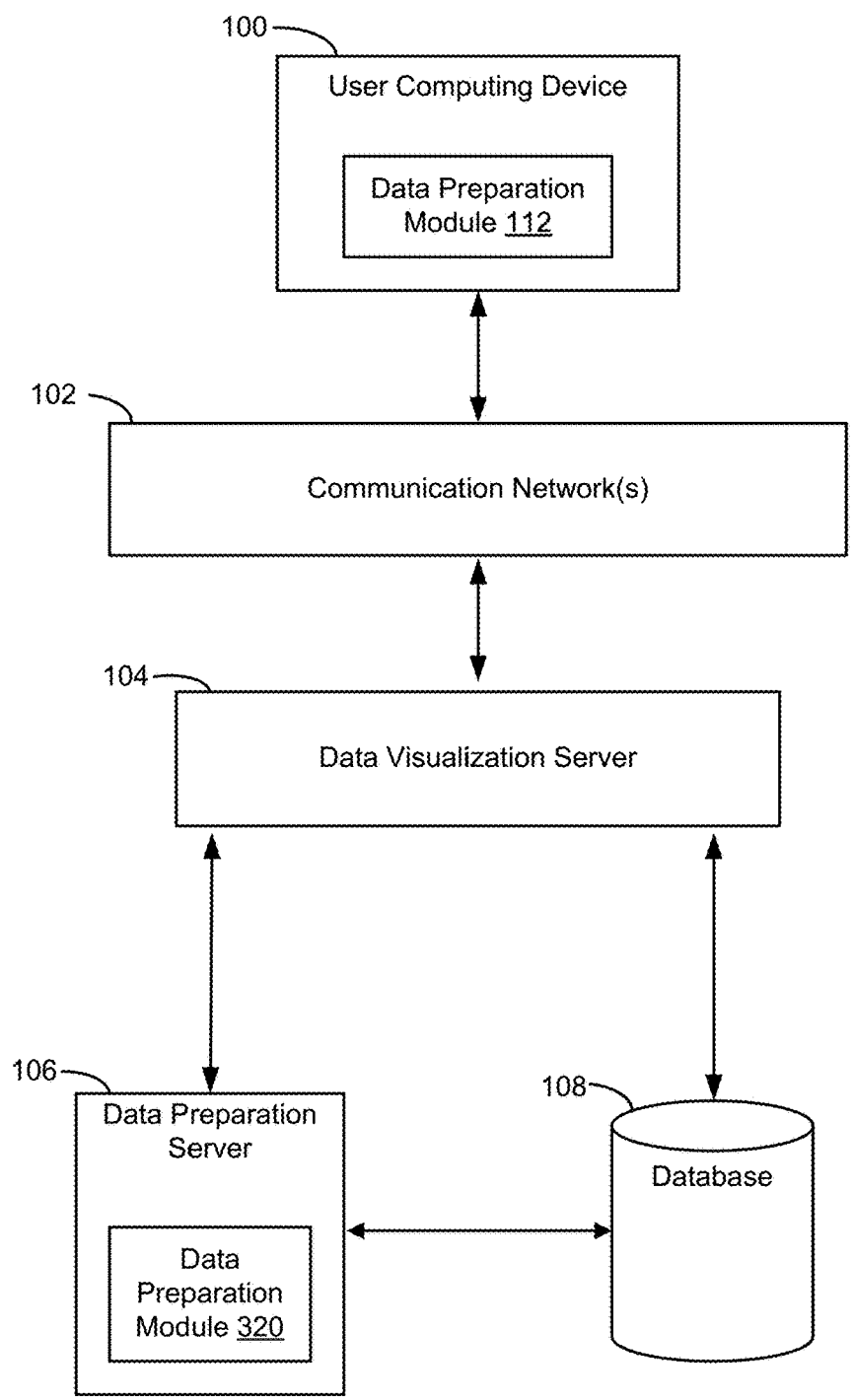
FIG. 1 illustrates a context for a process of preparing raw data for use in data visualizations in accordance with some implementations.

FIG. 1 illustrates the context in which some implementations operate. A user interacts with a user computing device 100 (also referred to as computing device 100 and device 100), such as a desktop computer, a laptop computer, a tablet computer, a mobile computing device, or a virtual machine running on such a device. An example computing device 100 is described below with respect to FIG. 2, including various software programs or modules that execute on the computing device 100. In some implementations, the computing device 100 includes one or more data sources 244 (FIG. 2), a data visualization application 224 (FIG. 2), and a data preparation module 112 that the computing device 100 uses to prepare raw data from the data sources for use in the data visualization application. Some implementations can prepare raw data for use in data visualizations without connecting to external data sources or programs over a network.

However, in some cases, the computing device 100 connects over one or more communications networks 102 to external databases (e.g., the database 108), a data preparation server 106, and/or a data visualization server 104. The communication networks 102 may include local area networks and/or wide area networks, such as the Internet. A data preparation server 106 (also referred to herein as a server 106) is described in more detail with respect to FIG. 3. In particular, some implementations provide a data visualization web application 222 (FIG. 2) that runs wholly or partially within a web browser 220 (FIG. 2) on the computing device 100. In some implementations, data visualization functionality is provided by both a local application 222 and certain functions provided by the server 106. For example, the server 106 may be used for resource intensive operations.

In some implementations, the computing device 100 connects to a remotely-located data preparation server 106 through communication network(s) 102. In this way, some data preparation operations can be performed remotely and computing resources at the computing device 100 can be preserved for other operations. The data preparation server 106, in some implementations, includes a data preparation module 320 that prepares raw data for use in data visualizations. For example, data sources can be sent to the data preparation server 106 through communication network(s) 102 for processing by the data preparation module 320. For example, if a particular data source contains numerous columns with raw data, then sending at least a portion of the columns with raw data for data preparation processing at the data preparation server 106 will preserve computing resources at the computing device 100.

In some implementations, after preparing the raw data (e.g., unformatted dates) for use in data visualizations, the prepped data can then be stored in the database 108 for future use.

Although illustrated as separate components, the data preparation server 106 and the database 108 are, in some implementations, components of the data visualization server 104.

Figure 2:
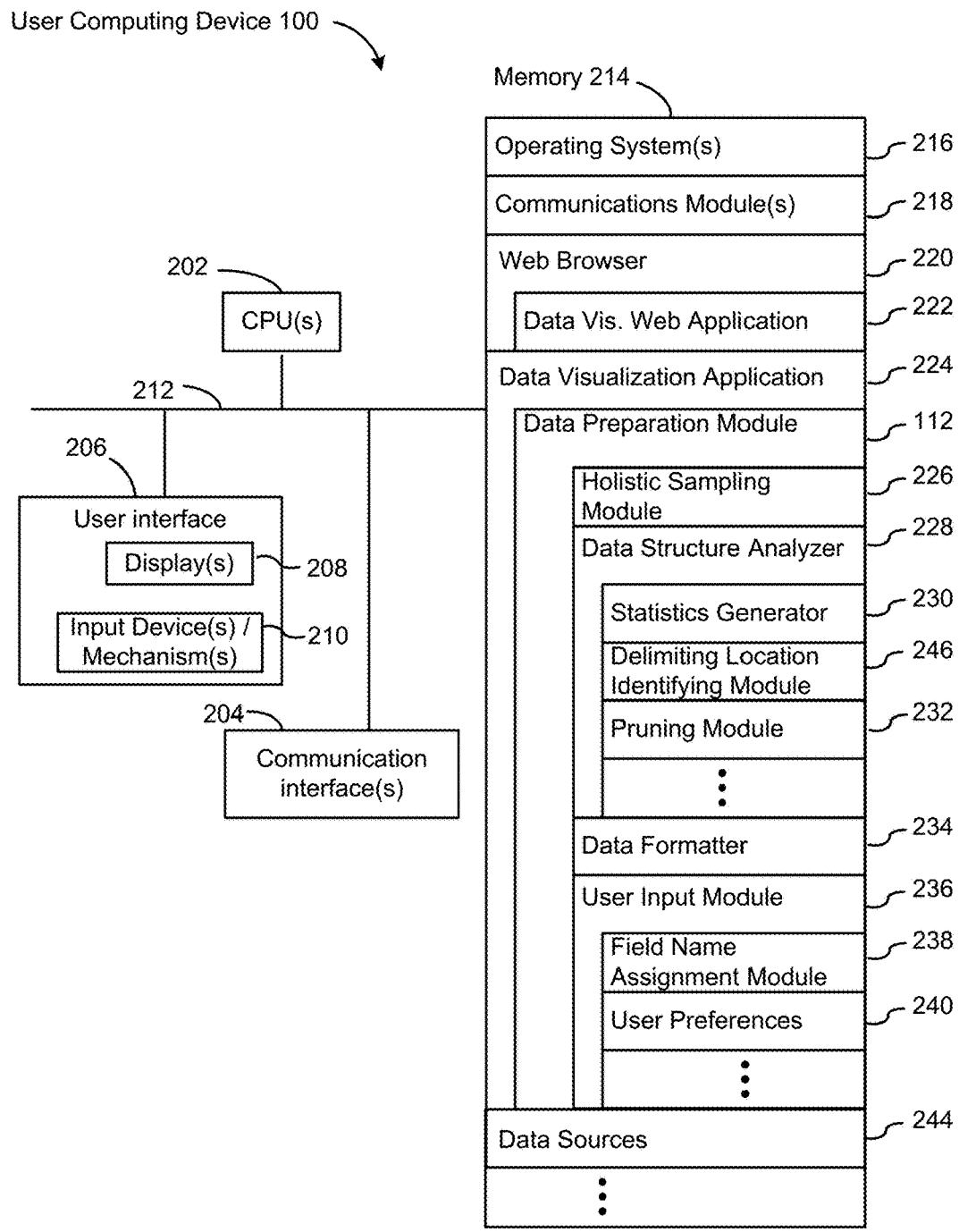
FIG. 2 is a block diagram of a computing device in accordance with some implementations.

FIG. 2 is a block diagram illustrating a computing device 100 that a user uses to create and display data visualizations in accordance with some implementations. A computing device 100 typically includes one or more processing units/cores (CPUs/GPUs) 202 for executing modules, programs, and/or instructions stored in the memory 214 and thereby performing processing operations; one or more network or other communications interfaces 204; the memory 214; and one or more communication buses 212 for interconnecting these components. The communication buses 212 may include circuitry that interconnects and controls communications between system components.

The computing device 100 also includes a user interface 206 comprising a display device 208 and one or more input devices or mechanisms 210. In some implementations, the input device/mechanism 210 includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch-screen display (also called a touch-sensitive display).

In some implementations, the computing device 100 has a memory 214 that includes high-speed random access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid-state storage devices. Optionally, the memory 214 includes one or more storage devices remotely located from the CPU(s)/GPUs 202. The memory 214, or alternately the non-volatile memory device(s) within the memory 214, comprises a non-transitory computer-readable storage medium. In some implementations, the memory 214, or the non-transitory computer-readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 100 to other computers and devices via the one or more communication interfaces 204 (wired or wireless) and one or more communication networks 102 (FIG. 1), such as the Internet, other wide area networks, local area networks, metropolitan area networks, and so on;
- a web browser 220 (or other client application capable of displaying web pages), which enables a user to communicate over a network with remote computers, servers, and devices. In some implementations, the web browser 220 executes a data visualization web application 222 provided by a data visualization server 104 (e.g., by receiving appropriate web pages from the server 104 as needed). In some implementations, a data visualization web application 222 is an alternative to storing a data visualization application 224 locally;
- a data visualization application 224, which enables users to construct data visualizations from various data sources. The data visualization application 224 retrieves data from a data source 244, then generates and displays the retrieved information in one or more data visualizations. In some instances, the data visualization application invokes other modules (either on the computing device 100, at a data visualization server 104, or at a data preparation server 106) to prepare raw data for use in data visualizations, as described in more detail below;
- the data visualization application 224 includes a data preparation module 112, which prepares raw data for use in data visualizations and some implementations include one or more of the following additional modules:
  - a holistic sampling module 226, which analyzes a data source (or a column within a data source) and retrieves or identifies a holistic sample of data values thereof;
  - a data structure analyzer 228 for analyzing data values contained in a data source, a column within a data source, or a sampling of data values thereof (e.g., a sample selected by holistic sampling module 226) to determine an appropriate structure for the analyzed data values using one or more of the following component modules:
    - a statistics generator 230 for generating statistics about the analyzed data values (e.g., range and cardinality statistics about integer-only dates);
    - a delimiting location identifying module 246 for identifying delimiting locations within the analyzed data values (e.g., identifying one or more consistent delimiters that occur in a substantial majority of the analyzed data values); and
    - a pruning module 232 for pruning potential structure candidates from a search tree (e.g., removing one or more potential structure candidates due to information received from statistics generator 230). In some implementations, the pruning module 232 identifies potential structure candidates (e.g., one or more domains comprise a structure candidate) for removal from the search tree by using a redundant, a prunable, and a context set. In some implementations, the redundant set includes all of the structure candidates that the current domain should not appear directly after; the prunable set includes all the domains that the current domains should not appear indirectly after, which enables uniqueness of field specifications (e.g., there should be only one month field in a potential structure candidate for a date); and the context set includes the set of domains which must appear before the current domain (e.g., an "hours" field in a date must be matched before a "minutes" field);
  - a data formatter 234 for formatting data. In some implementations, the data formatter 234 splits a column contained within a data source into multiple columns or formatting a column contained within a data source using an appropriate date format;
  - a user input module 236, which receives and processes input received from a user of the computing device 100. For example, a field name assignment module 238 can be used by user input module 236 to modify default, automatically-assigned field names and user preferences 240 can be used by user input module 236 to store historical information regarding user input. The user preferences 240 may include preferences that are explicitly stated and/or preferences that are inferred based on prior usage. The preferences may specify what types of data visualizations are preferred, the preferred data visualization types based on the data types of the selected data fields, preferences for visual encodings (such as size, shape, or color), weighting factors for the various ranking criteria (e.g., inferred by prior selections), and so on. Some implementations also provide for group preferences, such as preferences for a financial group or preferences for a marketing or sales group. Some implementations also identify the aggregate preferences of all users ("the wisdom of the herd"). Some implementations allow both individual and group preferences. Some implementations enable multiple levels of user preferences. For example, a user may specify general preferences as well as preferences for a specific data source or specific fields within a data source. For example, a user may have a specific preferred set of field names, default values for missing component date-parts, etc. for particular data sources containing information about product lines within a company; and
- zero or more data sources 244, which have data that may be used and displayed by the data visualization application 224 and may also contain raw data that requires further processing before being used in data visualizations. Data sources 244 can be formatted in many different ways, such as spreadsheets, XML files, flat files, CSV files, text files, desktop database files, or relational databases. Typically the data sources 244 are used by other applications as well (e.g., a spreadsheet application).

Each of the above identified executable modules, applications, or sets of procedures may be stored in one or more of the previously-mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above. In some implementations, the programs, modules, and data structures stored in the memory 214, or the non-transitory computer-readable storage medium of the memory 214, provide instructions for implementing some of the methods described below.

Although FIG. 2 shows a computing device 100 in accordance with some implementations, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
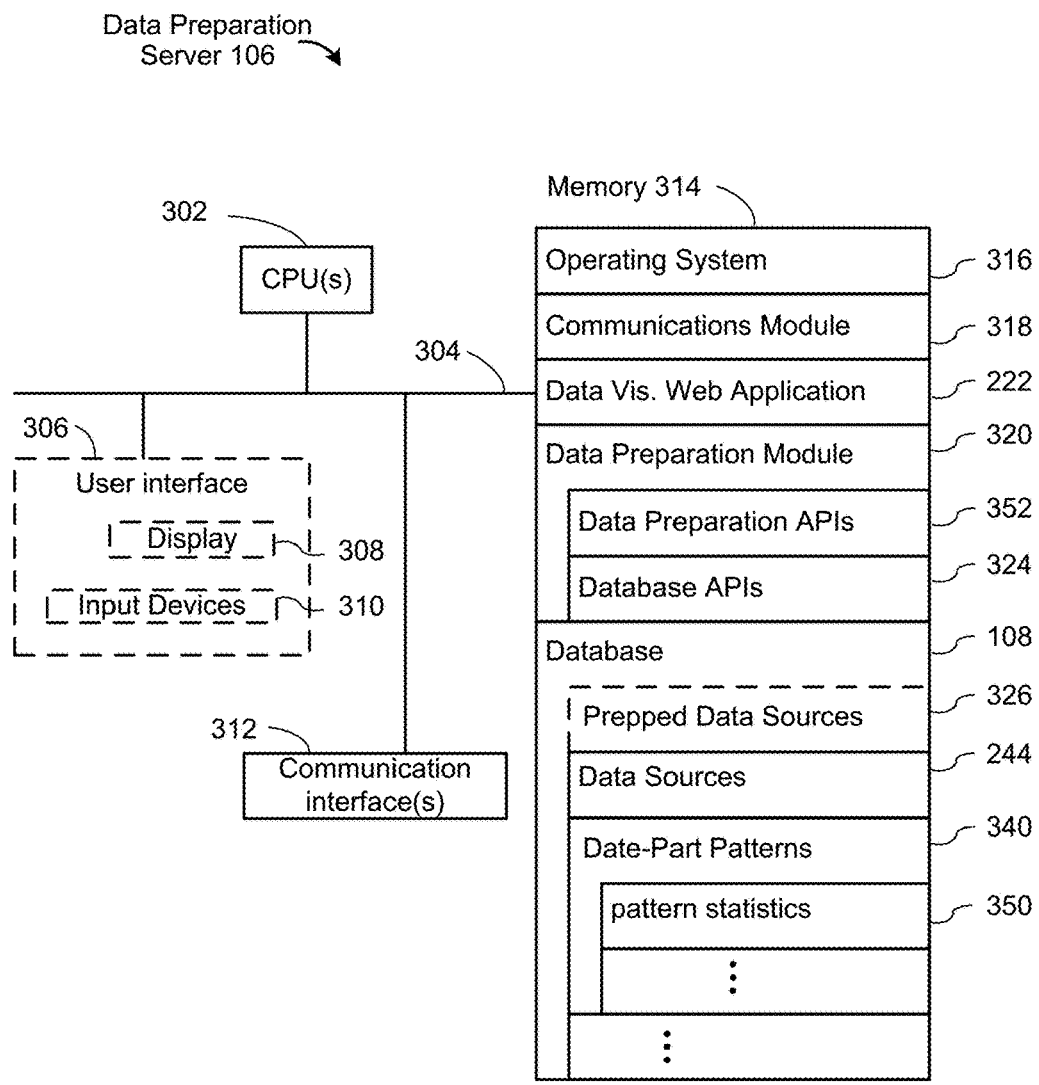
FIG. 3 is a block diagram of a data visualization server in accordance with some implementations.

FIG. 3 is a block diagram illustrating a data preparation server 106, in accordance with some implementations. As discussed with reference to FIG. 1 above, in some implementations, the data preparation server 106 is a component of data visualization server 104 and, as such, the foregoing description of the data preparation server 106 applies as well to implementations of a data visualization server 104 in which a data preparation server 106 is an included component.

A data preparation server 106 may host one or more databases 108 or may provide various executable applications or modules. A server 106 typically includes one or more processing units (CPUs/GPUs) 302, one or more network interfaces 304, a memory 314, and one or more communication interface(s) 312 for interconnecting these components. In some implementations, the server 104 includes a user interface 306, which includes a display device 308 and one or more input devices 310, such as a keyboard and a mouse.

The memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPU(s)/GPUs 302. The memory 314, or alternately the non-volatile memory device(s) within the memory 314, includes a non-transitory computer-readable storage medium. In some implementations, the memory 314 or the non-transitory computer-readable storage medium of the memory 314 stores the following programs, modules, and data structures, or a subset thereof:

- an operating system 316, which includes procedures for handling various basic system services and for performing hardware dependent tasks;
- a network communications module 318, which is used for connecting the server 106 to other computers via the one or more communication interfaces 304 (wired or wireless) and one or more communication networks 102 (FIG. 1), such as the Internet, other wide area networks, local area networks, metropolitan area networks, and so on;
- a data visualization web application 222, which may be downloaded and executed by a web browser 220 (FIG. 2) on a user's computing device 100. In general, a data visualization web application 222 has the same functionality as a desktop data visualization application 224, but provides the flexibility of access from any device at any location with network connectivity, and does not require installation and maintenance;
- a data preparation module 320, which may be invoked by either the data visualization application 224 or the data visualization web application 222. A similar data preparation module 112 was discussed above with respect to FIG. 2 and, in some implementations, the data preparation module 320 includes the same components described above with respect to data preparation module 112, including holistic sampling module 226, data structure analyzer 228 (with statistics generator 230, delimiting location identifying module 246, and pruning module 232), data formatter 234, and user input module 236 (with field name assignment module 238 and user preferences 240). The data preparation module 320 additionally includes, in some implementations, data preparation application programming interfaces (APIs) 352 for permitting access by the computing device 100 to the components of data preparation module 320 discussed above. The data preparation module 320 also includes, in some implementations, database application programming interfaces (APIs) 324 for permitting access by the computing device 100 to the information stored in server-side databases, such as the database 108;
- a database 108, which may be accessed by either the data visualization application 224 or the data visualization web application 222. The database 108 was described above with respect to FIG. 1, and also includes the following:
  prepped data sources 326 that contain data that is ready for use in data visualizations. For example, after sending raw data contained within data sources 244 to data preparation module 320, the data preparation module 320 prepares the raw data for use in data visualizations and sends prepped data sources 326 for storage in the database 108). In some implementations, instead of creating a prepped data source 326, a data source 244 is instead modified to include data that is ready for use in data visualizations (e.g., an additional data column or data field is added to the data source 244 with the prepped data); and
  in some implementations, the database 108 stores date-part patterns 340 that are used by the data preparation module 320. In some implementations, pattern statistics 350 are also stored with each of the date-part patterns 340 (e.g., range and cardinality statistics for year, month, day, and time of day date-parts). Examples of date-part patterns 340 and pattern statistics 350 and how they are applied and combined in order to prepare raw data for use in data visualizations are described in more detail below with respect to FIGS. 7A-7C.

Each of the above identified executable modules, applications, or sets of procedures may be stored in one or more of the previously-mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise re-arranged in various implementations. In some implementations, the memory 314 may store a subset of the modules and data structures identified above. Furthermore, the memory 314 may store additional modules or data structures not described above. In some implementations, the programs, modules, and data structures stored in the memory 314, or the non-transitory computer-readable storage medium of the memory 314, provide instructions for implementing some of the methods described below.

Although FIG. 3 shows a server 106, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 106 may be stored on a computing device 100. In some implementations, the functionality and/or data may be allocated between a computing device 100 and one or more servers (such as data visualization server 104). Furthermore, one of skill in the art recognizes that FIG. 3 need not represent a single physical device. In many implementations, the server functionality is allocated across multiple physical devices that comprise a server system (e.g., a server system may include a data preparation server 106 and a data visualization server 104). As used herein, references to a "server," "data visualization server," or "data preparation server" include various groups, collections, or arrays of servers that provide the described functionality, and the physical servers need not be physically collocated (e.g., the individual physical devices could be spread throughout the United States or throughout the world).

Figure 4A:
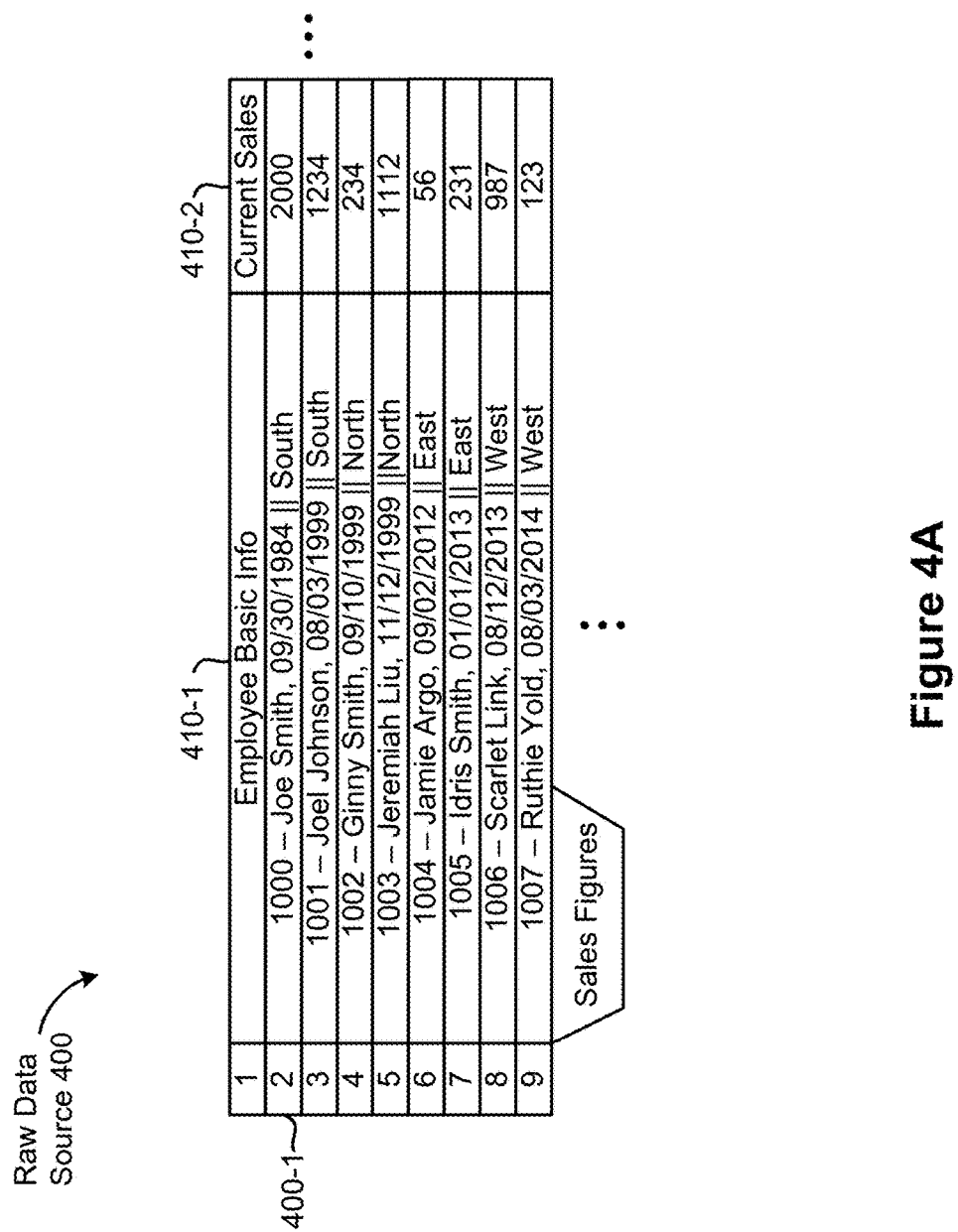

Examples of raw (i.e., original or unformatted) data sources and prepped data sources are illustrated in FIGS. 4A-4F. As shown in FIG. 4A, the raw data source 400 is a data structure (e.g., a spreadsheet) that includes a plurality of data values stored in data columns (also referred to as data fields). A raw data source 400, in some instances, includes a data column 410-1 for "Employee Basic Info" and a data column 410-2 for "Current Sales." In some instances, "Employee Basic Info" and "Current Sales" are referred to as field names. As also shown in FIG. 4A, a data value from each of the data columns forms a respective data row (e.g., data row 400-1 includes the data value "1000—Joe Smith, 09/30/1984||South" from the data column 410-1 and the data value "2000" from the data column 410-2).

In some implementations, raw data sources 400 are sent to a data preparation module 112 or 320 in order to prepare the data values contained therein for use in data visualizations. In some implementations, a raw data source 400 is automatically sent to the data preparation module 112 or 320 after a user selects the raw data source 400 in a data visualization user interface 500. In implementations, a user accesses a contextual menu by right-clicking on the data source within a data visualization user interface (e.g., on the text "Sales Figures" displayed within data field selection element 508 of data visualization user interface 500) and selecting an option to "prep all data." In some implementations, a user accesses a contextual menu by right-clicking on a field name (e.g., field name "Employee Basic Info" within the schema information region 510) associated with a specific data column (e.g., the field name "Employee Basic Info" is associated with the data column 410-1 of the raw data source 400) and selecting an option to "prep data column."

Figure 4B:
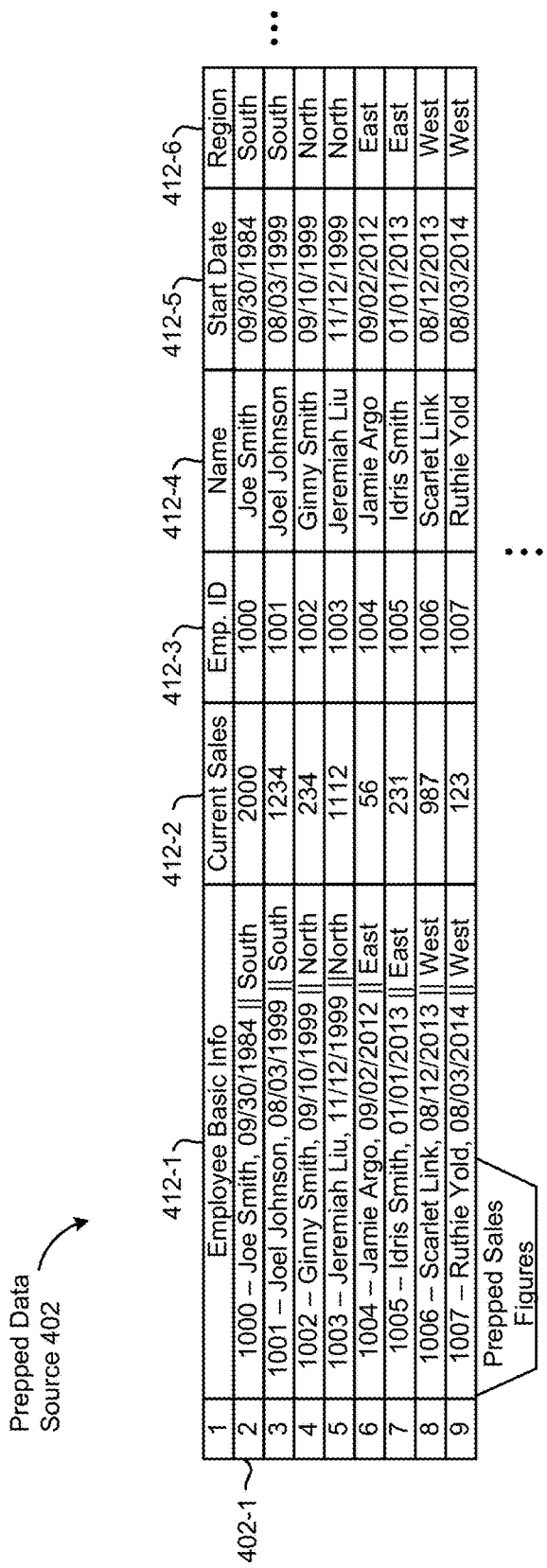

FIG. 4B illustrates a prepped data source 402 that is produced by data preparation module 112 or data preparation module 320 after preparing the data values contained in the raw data source 400 for use in data visualizations. As shown in FIG. 4B, the prepped data source 402 includes the same data columns as the raw data source 400 (e.g., the data column 412-1 for "Employee Basic Info" corresponds to the data column 410-1 of the raw data source 400 and the data column 412-2 corresponds to the data column 410-2 of the raw data source 400) and additional data columns created by the data preparation module 112 or 320. As shown in FIG. 4B, the additional data columns of the prepped data source 402 include: the data column 412-3 for "Emp. ID," the data column 412-4 for "Name," the data column 412-5 for "Start Date," and the data column 412-6 for "Region."

In some implementations, the additional data columns of the prepped data source 402 are created by analyzing the data values contained within the columns of the raw data source 400 to identify delimiting locations and then splitting each data value at the identified delimiting locations. A delimiting location is a location within a data value that contains one or more delimiters. For example, for the data value "Smith, Joe" some implementations identify the delimiting location corresponding to the comma and the space. In some implementations the space is simply stripped off of the data value and the comma provides the only delimiting location.

For example, consider the data row 400-1 of the raw data source 400, which contains the data value "1000—Joe Smith, 09/30/1984||South." Some implementations identify delimiting locations corresponding to "-"; ","; "/"; and "||". As discussed above, whitespace (i.e., spaces on either side of the delimiters defining a delimiting location), in some implementations, is a part of the delimiting locations, while in other implementations, the whitespace is stripped off of the data values before or after splitting the data values at the delimiting locations. In some implementations, delimiting locations are identified (e.g., by data preparation module 112 or 320) after selecting a sample of distinct values from a data column. Various sampling techniques are utilized, such as selecting the first n rows of the data column, selecting the evenly numbered rows, selecting rows randomly, and so on.

In some implementations, the delimiting locations are then used to split data values into multiple new data values (e.g., using data formatter 234). The new data values are then stored in new data columns. With reference to the data row 400-1 of the raw data source 400, in some circumstances, the data value contained therein is first split at "-" resulting in two new data values: 1) "1000" and 2) "Joe Smith, 09/30/1984||South." In some implementations, in accordance with a determination that the data value "1000" contains no additional delimiting locations, the data value "1000" is stored in a first new data column of the prepped data source 402 (e.g., the data column 412-3 for "Emp. ID").

In some implementations, in accordance with a determination that the data value "Joe Smith, 09/30/1984||South" contains additional delimiting locations (e.g., "," and "||"), the data value is split at each of the remaining delimiting locations, producing three new data values: 1) "Joe Smith"; 2) "09/30/1984"; and 3) "South." In some implementations, each of the three new data values is stored in a respective new data column (e.g., the data columns 412-4, 412-5, and 412-6, respectively). In some implementations, after preparing all of the data values within the raw data source 400 for use in data visualizations, the new data columns (e.g., the data columns 412-3, 412-4, 412-5, and 412-6) are combined with the existing data columns in the raw data source 400 to produce a single prepped data source 402 (which, in some implementations is then stored in the database 108). In other implementations, the new data columns are added to the raw data source 400 and, after adding the new data columns to the raw data source 400, the data source is then saved as a prepped data source 402. Additional details concerning prepped data sources are provided below, with reference to FIGS. 6A-6B.

Turning now to FIGS. 4C-4D, additional examples of a raw data source (e.g., the raw data source 404) and a corresponding prepped data source (e.g., the prepped data source 406) are provided, in accordance with some implementations. As shown in FIG. 4C, the raw data source 404 is a data structure (e.g., a spreadsheet) that includes a plurality of data values stored in data columns (also referred to as data fields). The raw data source 404, in some instances, includes three existing data columns: 1) a data column 414-1 for "Date #1"; 2) a data column 414-2 for "Amount ($)"; and 3) a data column 414-3 for "Date Approved." In some instances, "Date #1," "Amount ($)," and "Date Approved" are referred to as field names. In some implementations, certain special characters such as "#" and "$" are not allowed as part of field names. As shown in FIG. 4C, a data value from each of the data columns forms a respective data row (e.g., the data row 404-1 includes the data value "01012001" from the data column 414-1, the data value "105" from the data column 414-2, and the data value "01122001" from the data column 414-3).

In some implementations, raw data sources (e.g., the raw data source 404) are sent to data preparation module 112 or 320 in order to prepare the data values contained therein for use in data visualizations, as discussed above. FIG. 4D illustrates a prepped data source 406 that is produced by data preparation module 112 or 320 after preparing the data values contained in the raw data source 404 for use in data visualizations. As shown in FIG. 4D, the prepped data source 406 includes the same data columns as the raw data source 404 (e.g., the data column 416-1 for "Date #1" corresponds to the data column 414-1 of the raw data source 404, the data column 416-3 corresponds to the data column 414-2 of the raw data source 404, and the data column 416-4 corresponds to the data column 414-3 of the raw data source 404) and additional data columns created by data preparation module 112 or 320. As shown in FIG. 4D, the prepped data source 406 includes the additional data column 416-2 for "Prepped Date #1."

In some implementations, the additional data columns of the prepped data source 406 are created by analyzing the data values contained within the columns of the raw data source 404 (e.g., unformatted dates in an integer-only format, such as those contained in data columns 414-1 and 414-3 of the raw data source 404) to determine a suitable format for the data contained therein (e.g., a suitable date format, such as "MMddyyyy"). More specifically, in some implementations, a user indicates that one or more data columns require formatting. For example, a user selects a data column for formatting by right-clicking on a field name associated with the data column 414-1 that is displayed within a schema information region 510 and selects an option to format the data contained within the selected data column. The data preparation module 112 or 320 (or a component thereof, such as statistics generator 230 of data structure analyzer 228) then generates statistics that describe the data values contained within the selected column and selects a date format using the generated statistics. For example, the generated statistics include minimum and maximum values for the data values and the date format is selected based on a determination that a range of values associated with the date format includes the minimum and maximum values.

In some implementations, the date format is then applied to each data value to produce a respective formatted date (e.g., using the data formatter 234, FIG. 2) and the formatted dates are stored in a new data column. For example, if data preparation module 112 or 320 determines that the date format "MMddyyyy" matches the integer-only values in the data column 414-1, this date format is applied to all values contained within the data column 414-1. For example, after applying the date format to the data value "01012001" in the data row 404-1, the formatted date (e.g., a native Julian date) is produced and stored in the new data column 416-2 of the prepped data source 406. Note that the new column 416-2 stores actual "date" values; the character string "01/01/2001" shown in FIG. 4D is one way to display the stored date value.

In some implementations, graceful error handling is also provided by fixing potentially erroneous data values before applying the date format. For example, the data row 404-2 of the raw data source 404 contains the data value "090904" for the data column 414-1 and the data row 404-3 contains the data value "02972001" for the data column 414-1. In some implementations, these data values are flagged by the data preparation module 112 or 320 as potentially-erroneous and then further processing is applied to fix the potentially-erroneous data values.

For example, in some implementations, the data value "090904" is fixed by categorizing the components of the data value and determining that "09" is a month, "09" is a day, and "04" is a year and then updating the year component to "2004," so that the date format can be gracefully applied to produce the prepped (i.e., formatted) data value of "09/09/2004" in row 406-2 of the prepped data source 406. Additionally, in some implementations, the data value "02972001" is fixed by categorizing the components of the data value and determining that "02" is a month, "97" is a day, and "2001" is a year and then determining that the day component is outside of a range of valid values for days (e.g., using pattern statistics 350 of date-part patterns 340, stored in the database 108). In some implementations, the out-of-range month component is fixed by updating the month component to "07," so that the date format can be gracefully applied to produce the prepped (i.e., formatted) data value of "02/07/2001" in row 406-3 of the prepped data source 406. Some implementations use keyboard layout to help identify the most probable replacement. For example, a "0" is more likely to be entered accidentally as a "9" than any of the other digits. In some implementations, the "97" is not altered because there are multiple possible replacement values, including "07," "17," and "27," each of which may be the "correct" replacement value.

Additional details concerning the use of component date-parts and pattern statistics to gracefully handle potential errors are discussed below, with reference to FIGS. 7A-7C. More generally, additional details concerning formatting dates for prepped data sources are also provided below, with reference to FIGS. 7A-7C.

Turning now to FIGS. 4E-4F, additional examples of a raw data source (e.g., the raw data source 408) and a corresponding prepped data source (e.g., the prepped data source 410) are provided, in accordance with some implementations. As shown in FIG. 4E, the raw data source 408 is a data structure (e.g., a spreadsheet) that includes a plurality of data values stored in data columns (also referred to as data fields). The raw data source 408, in some instances, includes four existing data columns: 1) a data column 418-1; 2) a data column 418-2; 3) a data column 418-3; and 4) a data column 418-4. As shown in FIG. 4E, the data columns of the raw data source 408 include nondescript (e.g., default) field names (also referred to as column headers or header labels). In some implementations, after selecting a data source within a data visualization user interface (e.g., the data visualization user interface 500), data preparation module 320 or 112 selects descriptive field names for data columns having only default field names. In some implementations, a user is also able to modify default field names and/or select descriptive field names using the field name assignment module 238 of the user input module 236.

In some implementations, raw data sources 408 are sent to data preparation module 112 or 320 in order to prepare the data values contained therein for use in data visualizations, as discussed above. FIG. 4F illustrates a prepped data source 410 that is produced by data preparation module 112 or 320 after preparing the data values contained in the raw data source 408 for use in data visualizations. As shown in FIG. 4F, the prepped data source 410 includes the same data columns as the raw data source 404 (e.g., the data column 420-1 for "Month" corresponds to the data column 418-1 of the raw data source 408, the data column 420-2 corresponds to the data column 418-2 of the raw data source 408, the data column 420-3 corresponds to the data column 418-3 of the raw data source 408, and the data column 420-5 corresponds to the data column 418-4 of the raw data source 408) and additional data columns created by data preparation module 112 or data preparation module 320. As shown in FIG. 4F, the prepped data source 406 includes the additional data column 420-4 for "Expense Date."

In some implementations, the additional data columns of the prepped data source 410 are created by analyzing the data values contained within the columns of the raw data source 408 (e.g., unformatted dates that are created by combining data values contained in three distinct data columns, such as data columns 418-1, 418-2, and 418-3 of the raw data source 408) to determine a suitable date part for each field.

More specifically, in some implementations, a method of preparing data for use in data visualizations by combining distinct data columns into a single formatted date is provided. The method is performed at a computing device having one or more processors and memory storing one or more programs configured for execution by the one or more processors. The method includes: determining minimum and maximum values for a plurality of integer-valued columns in a data source (e.g., the data columns 418-1, 418-2, and 418-3 of the raw data source). In some implementations, the plurality of integer-valued columns in the data source are identified by a user (e.g., by selecting field names) selecting an option to prepare the identified columns for use in data visualizations.

For each respective column of the plurality of integer-valued columns, the method includes: 1) when the corresponding respective minimum and maximum values are in the range of 1-12, designating the respective column as a possible month or day column; 2) when the corresponding respective minimum and maximum values are in the range of 1-31, designating the respective column as a possible day column; and 3) when the corresponding respective minimum and maximum values are consistent with the respective column representing years, designating the respective column as a possible year column. For example, the data column 418-1 of the raw data source 408 is designated as a possible month column, the data column 418-2 of the raw data source 408 is designated as a possible day column, and the data column 418-3 of the raw data source 408 is designated as a possible year column. In some implementations, the designations also rely on cardinality statistics to produce accurate designations for each respective column. For example, the data column 418-1 is more likely to represent a month rather than a day because the range is only 1-12.

In some implementations, the method additionally includes: selecting a triple of columns (A, B, C). In some implementations, A, B, and C are distinct columns from the data source, A is designated as a possible month column (e.g., the column 418-1 of the raw data source 408), B is designated as a possible day column (e.g., the column 418-2 of the raw data source 408), and C is designated as a possible year column (e.g., the column 418-3 of the raw data source 408). In some implementations, the method also includes: creating a new data column having a date data type (e.g., the data column 420-4 of the prepped data source 410). In some implementations, for each respective row (e.g., each respective row of the raw data source 408), respective values for columns A, B, and C are used to form a date value for the new data column according to the designations of the columns A, B, and C. For example, the data row 408-1 of the raw data source 408 is used to form a date value of ("02/11/1987") in the new data column 420-4 for "Expense Date" in the prepped data source 410.

In some implementations, the method further includes: receiving user input to assign a field name to the new data column. For example, display a dialog box within data visualization user interface 500, FIG. 5A and receiving user input through field name assignment module 238. Alternatively, allow a user to select a field name within the schema information region 510 and directly edit the selected field name. In some implementations, the method further includes: displaying a schema information region in a data visualization user interface (e.g., the schema information region 510, FIG. 5A). The schema information region includes field names of data columns from the data source (e.g., the schema information region displays "Month," "Day," "Year," and "Amount" (or the default values from the raw data source 408 of "A," "B," "C," and "D") and the assigned field name of the new data column. For example, the schema information region 510 could be updated to display "Expense Date." In some implementations, the method also includes: displaying a data visualization based on user selection of field names from the schema information region, where the user selection includes the field name assigned to the new data column.

In some implementations, one or more of the respective rows contains a data value in a data column that is blank and the method includes: inserting a default constant value in accordance with the designated type for the data column. For example, if the data row 408-1 contains a blank value in the data column 418-1, then, after designating the data column 418-1 as a possible month column, the blank value is replaced with the default value for months (e.g., "01"). In some implementations, the inserted value is "unspecified" or NULL. In this case, the resulting computed "date" value is also unspecified or NULL. This avoids constructing incorrect values and alerts the user to the problem in the raw data.

Additional details concerning formatting dates for prepped data sources are also provided below, with reference to FIGS. 7A-7C.

Although illustrated as a particular implementation of a data structure (e.g., a spreadsheet), the data sources in FIGS. 4A-4F, in some implementations, are implemented in XML files, tables within a relational database, text files, and/or any other suitable format for storing data values.

Figure 5A:
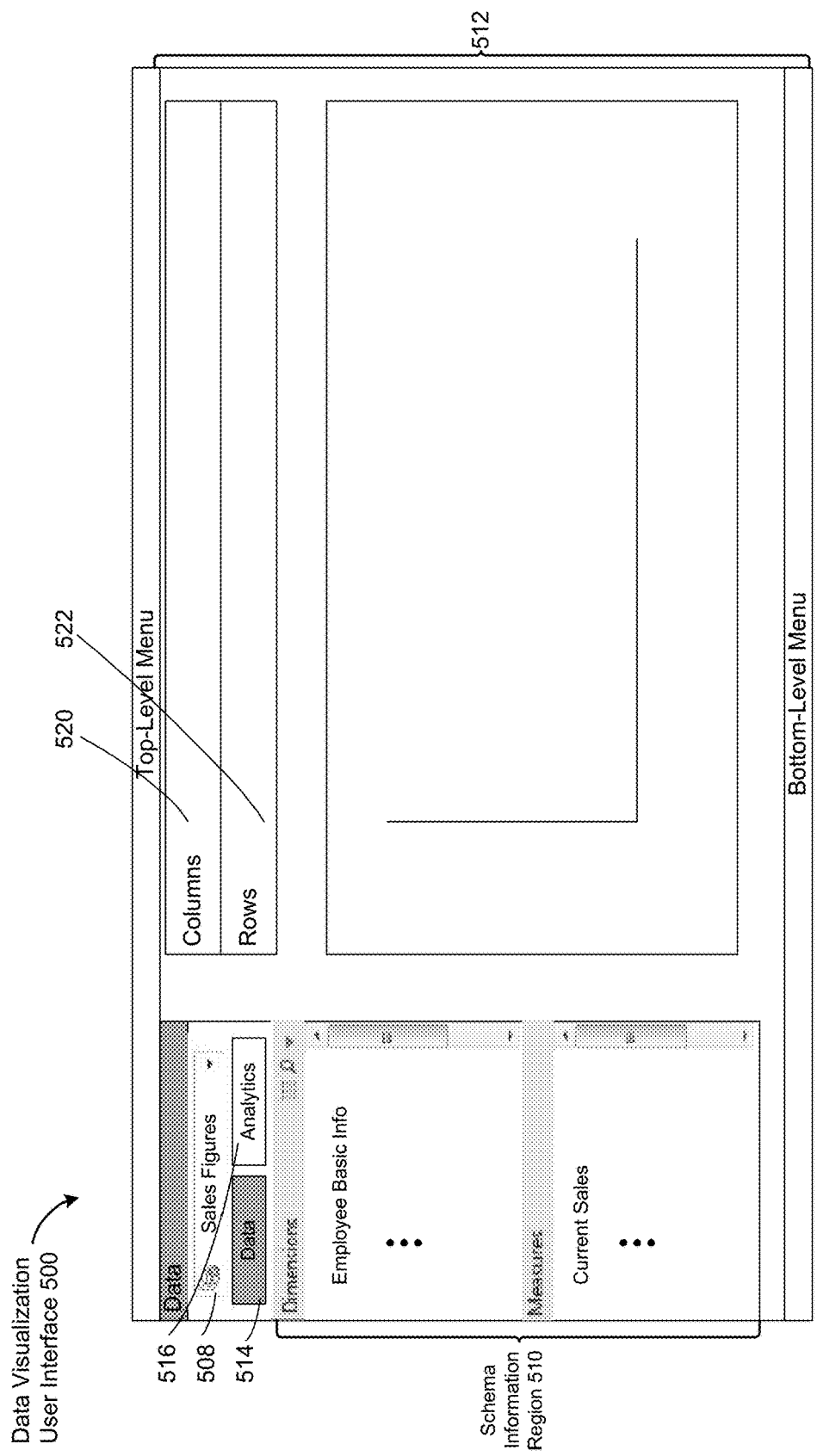
FIG. 5A illustrates a data visualization application with a data source that contains raw data in accordance with some implementations.

FIG. 5A illustrates a data visualization user interface 500 in accordance with some implementations. In some implementations, the data visualization user interface 500 is displayed within a data visualization web application 222 (or within a web browser 220) or within a data visualization application 224. When the Analytics tab 516 is selected, the data visualization user interface 500 displays a list of analytic functions. As pictured in FIG. 5A, when the data tab 514 is selected, the data visualization user interface 500 includes a schema information region 510, which is also referred to as a data pane. The data visualization user interface 500 also includes a data source selection element 508 that allows a user to choose a data source. The schema information region 510 provides named data elements (field names) that may be selected and used to build a data visualization (e.g., the data elements are extracted from the chosen data source and displayed within the schema information region 510). In some implementations, the list of field names is separated into a group of dimensions and a group of measures (typically numeric quantities). Some implementations also include a list of parameters.

As pictured in FIG. 5A, the data source selection element 508 is used to select a data source and the schema information region 510 is updated to display dimensions and measures associated with the data source. For example, selecting the data source from FIG. 4A, the schema information region 510 displays the field name "Employee Basic Info" in the dimensions section and displays the field name "Current Sales" in the measures section. In some implementations, the field names "Employee Basic Info" and "Current Sales" are both extracted from a raw data source 400, while in other implementations, the field names are assigned by a user (e.g., using the field name assignment module 238).

The data visualization user interface 500 also includes a data visualization region 512. The data visualization region 512 includes a plurality of shelf regions, such as a columns shelf region 520 and a rows shelf region 522. These are also referred to as the column shelf 520 and the row shelf 522. Some implementations use the column shelf 520 and the row shelf 522 to determine the characteristics of a displayed data visualization within data visualization region 512. In some implementations, a user places field names into these shelf regions (e.g., by dragging fields from the schema information region 510 to either column shelf 520 or row shelf 522), and the field names define the data visualization characteristics. For example, a user may choose a vertical bar chart, with a column for each distinct value of a field placed in the column shelf region. The height of each bar is defined by another field placed into the row shelf region. In some implementations, field names are displayed graphically as boxes or "pills" as they are moved into a shelf region. When a shelf region has two or more field names, the boxes or pills help to distinguish the multiple items visually.

As illustrated in FIG. 5A, the data visualization region 512 also has a large space for displaying a visual graphic. Because no data elements have been selected yet, the space initially has no visual graphic. In some implementations, the data visualization region 512 has multiple layers that are referred to as sheets.

Figure 5B:
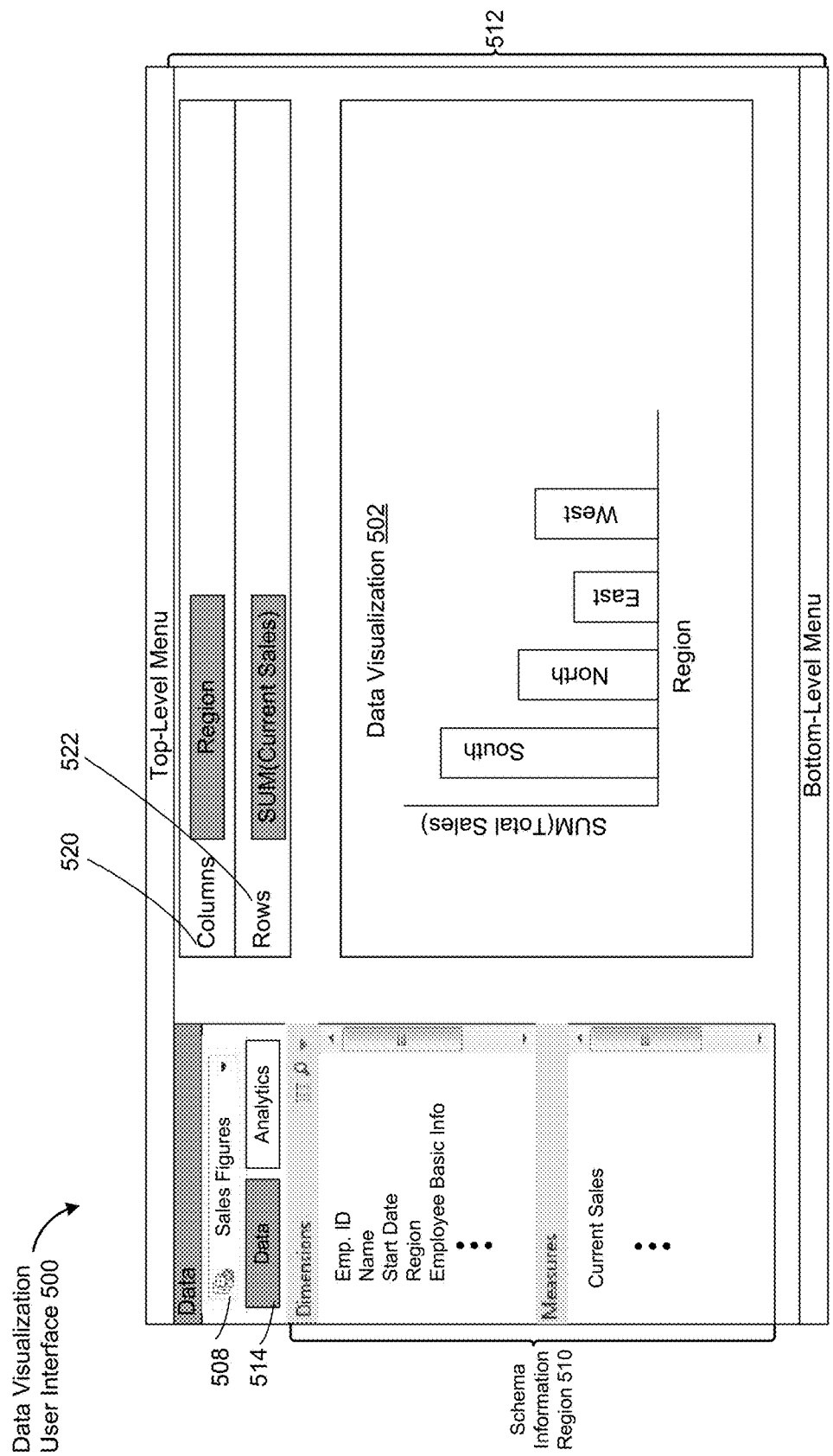
FIG. 5B illustrates a data visualization application with a data source that has been prepared for use in data visualizations in accordance with some implementations.

Turning now to FIG. 5B, an updated data visualization user interface 500 is illustrated, in accordance with some implementations. In FIG. 5B, a prepped data source has been selected (e.g., the prepped data source 402) in the schema information region and a visual graphic (e.g., a bar chart comparing total sales and region) is illustrated in the data visualization region 512. In some implementations, data visualization user interface 500 is automatically updated after a data preparation operation is completed. For example, after the data values contained in the raw data source 400 are prepared for use in data visualizations, the data visualization user interface 500 automatically refreshes and displays an updated list of field names in the dimensions and measures sections of the user interface.

In the illustrated example of FIG. 5B, the data column 410-1 for "Employee Basic Info" from the raw data source 400 has been prepared for use in data visualizations by splitting the data values contained therein and storing the new data values in the new data columns 412-3, 412-4, 412-5, and 412-6 of the prepped data source 402. The data visualization user interface 500 has been refreshed to display the field names "Emp. ID," "Name," "Start Date, and "Region" associated with the new data columns created during the data preparation process. In some implementations, one or more user interface elements (e.g., menus, click sequences, etc.) are available to allow users to modify the field names associated with the new data columns. The new field names associated with the new data columns are also available for selection from within schema information region 510, in order to produce data visualizations. For example, the illustrated data visualization 502 shows a bar chart of data values for SUM(Total Sales) and Region.

Figure 6A:
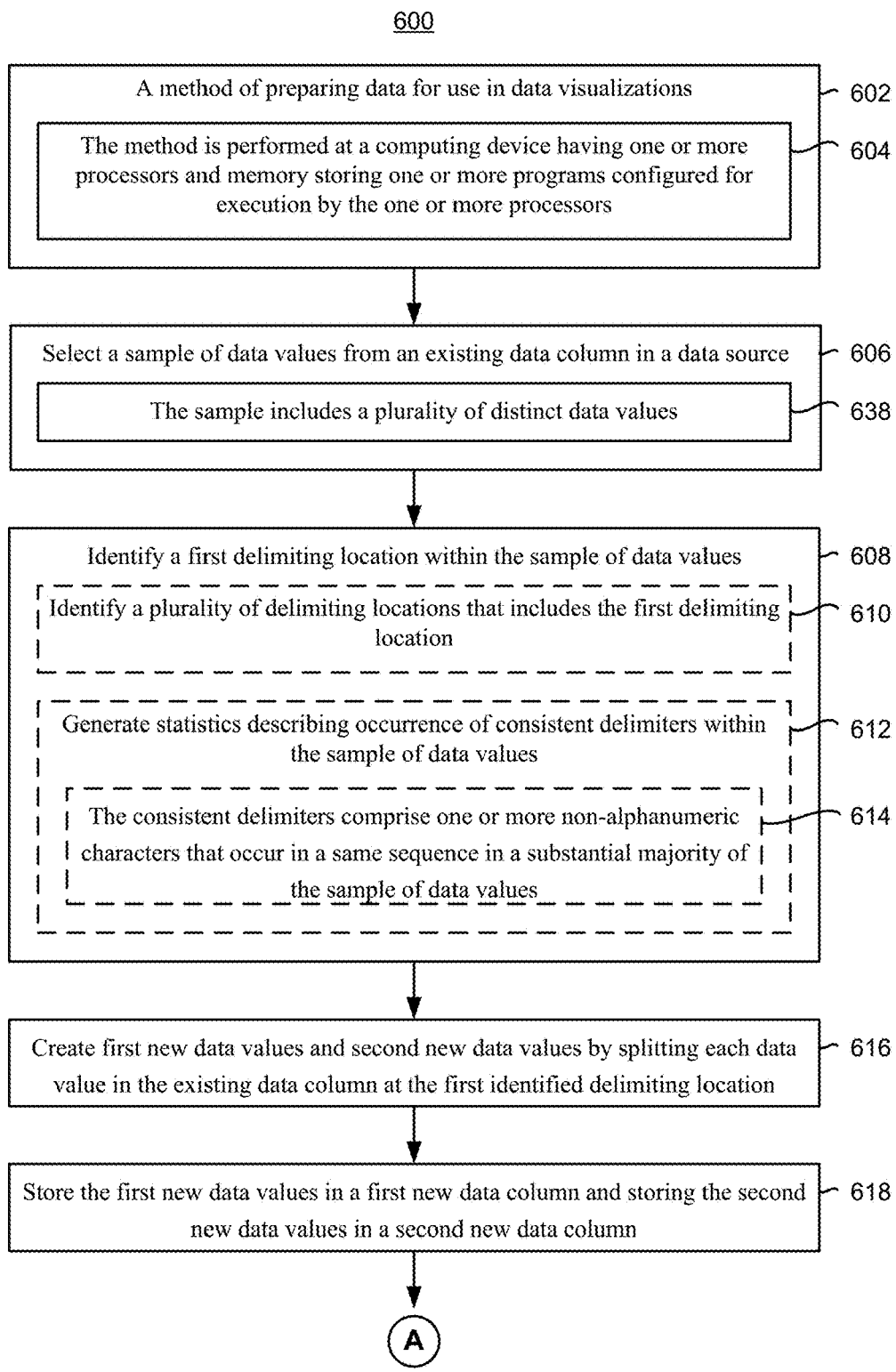
FIGS. 6A-6B provide a flow diagram for a process, performed at a computing device, of preparing raw data for use in data visualizations in accordance with some implementations.
Figure 6B:
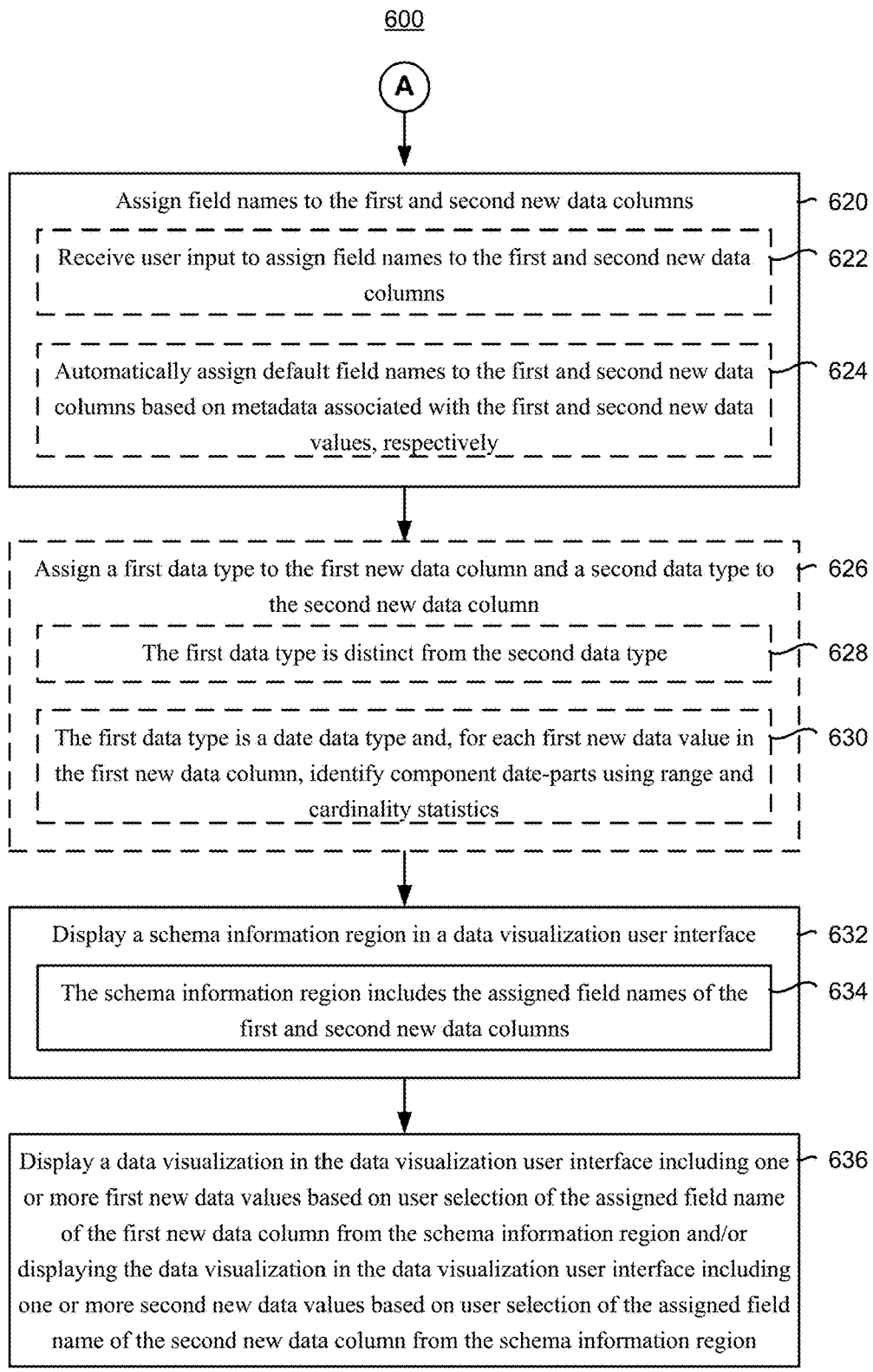

FIGS. 6A-6B provide a flow diagram of a method 600 of preparing raw data for use in data visualizations (602) in accordance with some implementations. The method 600 is performed (604) at a computing device having one or more processors and memory storing one or more programs configured for execution by the one or more processors. In some implementations, the operations shown in FIGS. 6A-6B correspond to instructions stored in computer memory or other non-transitory computer-readable storage medium (e.g., the memory 214).

The method 600 provides a fast, intuitive, easy-to-use, and robust way to prepare raw data for use in data visualizations. The method reduces the new learning required of a user of a data visualization application when preparing raw data, thereby creating a more effective and efficient human-machine interface. Furthermore, enabling a user to prepare raw data for use in data visualizations faster and more efficiently allows users to create more sophisticated and detailed data visualizations, thereby allowing users to rely on the data visualizations to make better-informed business decisions.

Referring now to FIG. 6A, the computing device 100 selects (606) a sample of data values from an existing data column in a data source. In some implementations, the sample includes (638) a plurality of distinct data values. For example, the raw data source 400 is one data source. The computing device 100 (or a component thereof, such as the holistic sampling module 226) selects a sample of data values from an existing data column in the raw data source 400. The sample may be a random sample of rows, every tenth row, the first N rows, or other types of samples using various sampling techniques. In some implementations, before selecting a sample, the computing device 100 determines (i.e., without user input) that a particular data column within the raw data source 400 contains data that requires preparation prior to use in data visualizations. In some implementations, a data visualization application 224 or a data visualization web application 222 accessed through a web browser (or components thereof, such as data preparation module 112 or 320) determines that a particular data column requires preparation prior to use in data visualizations by detecting the presence of multiple delimiting locations within a substantial majority of the data values contained within a data column. Here, a substantial majority may be 80%, 90%, 95%, 99%, or similar value depending on the implementation. In some implementations, a data visualization application 224 or a data visualization web application 222 accessed through a web browser 220 on the computing device 100 receives input from a user identifying a particular data column as containing data values that require preparation prior to use in data visualizations. For example, the user right-clicks on the "Employee Basic Info" data column displayed within the dimensions section of the data visualization user interface 500 and selects a menu option for performing data preparation on the selected data column.

In some implementations, the computing device identifies (608) a first delimiting location within the sample of data values. For example, in the raw data source 400, some implementations would identify the location of "-" as the first delimiting location. In some implementations, the first delimiting location is included (610) in a plurality of delimiting locations that are all identified by the computing device. For example, continuing the example above in which the first three data rows of the raw data source 400 are selected as the sample, the computing device analyzes the sample of data values and determines that at least three delimiting locations are present in all of the data values, and correspond to: 1) "-"; 2) ","; and 3) "∥." In some implementations, the delimiting locations are not defined to include whitespace, as discussed above, and the whitespace is simply trimmed or stripped off. In some implementations, the delimiting locations are defined to exclude locations of certain characters such as "/" to prevent improper splitting. For example, the symbol "/" be excluded to that a string representing a date is not improperly split up.

In some implementations, the computing device generates (612) statistics describing occurrence of consistent delimiters within the sample of data values. In some implementations, the consistent delimiters comprise (614) one or more non-alphanumeric characters (e.g., "-"; ","; "."; """; "*"; "∥"; "\") that occur in a same sequence in a substantial majority (e.g., 70%, 75%, 80%, 85%, 90%, or more) of the sample of data values.

In some implementations, the computing device creates (616) first new data values and second new data values by splitting each data value in the existing data column at the first identified delimiting location. In other words, the computing device uses the first delimiting location that was identified by analyzing only the sample of data values and uses it to split all data values within the data column (i.e., not just the data values in the sample). For example, if the first identified delimiting location is "-" then a data value that is not contained within the sample, such as "1005—Idris Smith, 01/01/2013∥East" is split at the "-" in order to produce two data new data values: 1) "1005" and 2) "Idris Smith, 01/01/2013∥East." In some implementations the first identified delimiting location is within a plurality of identified delimiting locations and the data values are each split at all of the delimiting locations contained within the plurality.

In some implementations, the computing device stores (618) the first new data values in a first new data column (e.g., "1005" of the preceding example is stored in a new data column 412-3 of the prepped data source 402) and stores the second new data values in a second new data column. In implementations in which a plurality of delimiting locations are identified, the second new data column may be a temporary data column (e.g., a data column that is stored only in a portion of volatile memory of the memory 214), so that the second new data values can then be retrieved and quickly split at the additional delimiting locations contained within the plurality.

In some implementations, the computing device assigns (620) field names to the first and second new data columns. For example, as shown in FIG. 4B, the new data columns 412-3, 412-4, 412-5, and 412-6 are created and assigned field names of "Emp. ID," "Name," "Start Date," and "Region," respectively. In some implementations, the computing device receives (622) user input to assign field names to the first and second new data columns. In some implementations, the computing device automatically assigns (624) field names to the first and second new data columns based on metadata associated with the first and second new data values, respectively. For example, the statistics generator 230 of data structure analyzer 228 can be utilized to analyze the new data values (i.e., create metadata associated with the new data values) and this analysis can be compared to statistics stored at a data preparation server 106 (e.g., in the database 108), in order to locate and automatically assign appropriate field names. In some implementations, the data preparation server 106 or the computing device 100 stores a record of previous data preparation operations and if a previously-completed operation utilized similar delimiting locations, then the field names assigned to the new data columns generated during the previously-completed data preparation operation can be assigned to corresponding new data columns of the current data preparation operation.

In some implementations, the computing device assigns (626) a first data type to the first new data column and a second data type to the second new data column. In some implementations, the first data type is distinct (628) from the second data type. In some implementations, the first data type is (630) a date data type (e.g., datetime) and, for each new data value in the first new data column, the computing device identifies (630) component date-parts using range and cardinality statistics. In some implementations pruning is utilized to efficiently identify component date-parts. An exemplary method for pruning includes: (i) receiving a first data value (e.g., a data value "01012001" from the data column 414-1 of the data row 404-1 in the raw data source 404); (ii) generating possible date-parts for describing the first data value (e.g., using the date-part patterns 340 and the data structure analyzer 228); (iii) based on range and cardinality statistics associated with a first date-part of the possible date-parts, determining that the first date-part describes a first portion of the first data value (e.g., determining that a month date-part describes the first two digits in the data value "01012001"); and (iv) removing a first set of date-parts from the possible date-parts based on positional information associated with the possible date-parts (e.g., removing an hours date-part from the search tree for the next component date-part because hours will not follow years directly in a formatted date). In some implementations, the positional information indicates that the date-parts within the first set of date-parts do not appear before the first date-part (e.g., hours date-parts will not appear before year date-parts in a formatted date). In some implementations, the first date-part is a month and the first set of date-parts includes: seconds, minutes, hours, and months. In some implementations, the pruning method includes: removing a second set of date-parts from the possible date-parts based on the positional information. The positional information indicates that the date-parts within the second set of date-parts do not appear in a position that is two or more date-parts away from the first date-part. In some implementations, the second set of date-parts includes days.

In some implementations, the computing device displays (632) a schema information region 510 in a data visualization user interface 500. In some implementations, the schema information region includes (634) the assigned field names of the first and second new data columns. For example, the schema information region 510 includes field names for the new data columns created during the data preparation operation, such as "Emp. ID," "Name," "Start Date," and "Region." In some implementations, the computing device displays (636) a data visualization in the data visualization user interface including one or more first new data values based on user selection of the assigned field name of the first new data column from the schema information region and/or displaying the data visualization in the data visualization user interface including one or more second new data values based on user selection of the assigned field name of the second new data column from the schema information region. As pictured in FIG. 5B, a user may select the assigned field name for the new data column "Region" by dragging this selected field name to the columns shelf 520. The user drags the measure "Current Sales" to the rows shelf 522, which may be converted to SUM (Current Sales) by default. In some implementations, this produces a visual graphic such as the bar chart data visualization 502.

It should be understood that the particular order in which the operations in FIGS. 6A-6B have been described is merely exemplary and is not intended to indicate that the described order is the only order in which the operations could be performed. One of ordinary skill in the art would recognize various ways to reorder and/or combine the operations described herein. Additionally, it should be noted that other processes such as those described below with reference to FIGS. 7A-7C can be combined with the processes described in FIGS. 6A-6B.

Figure 7A:
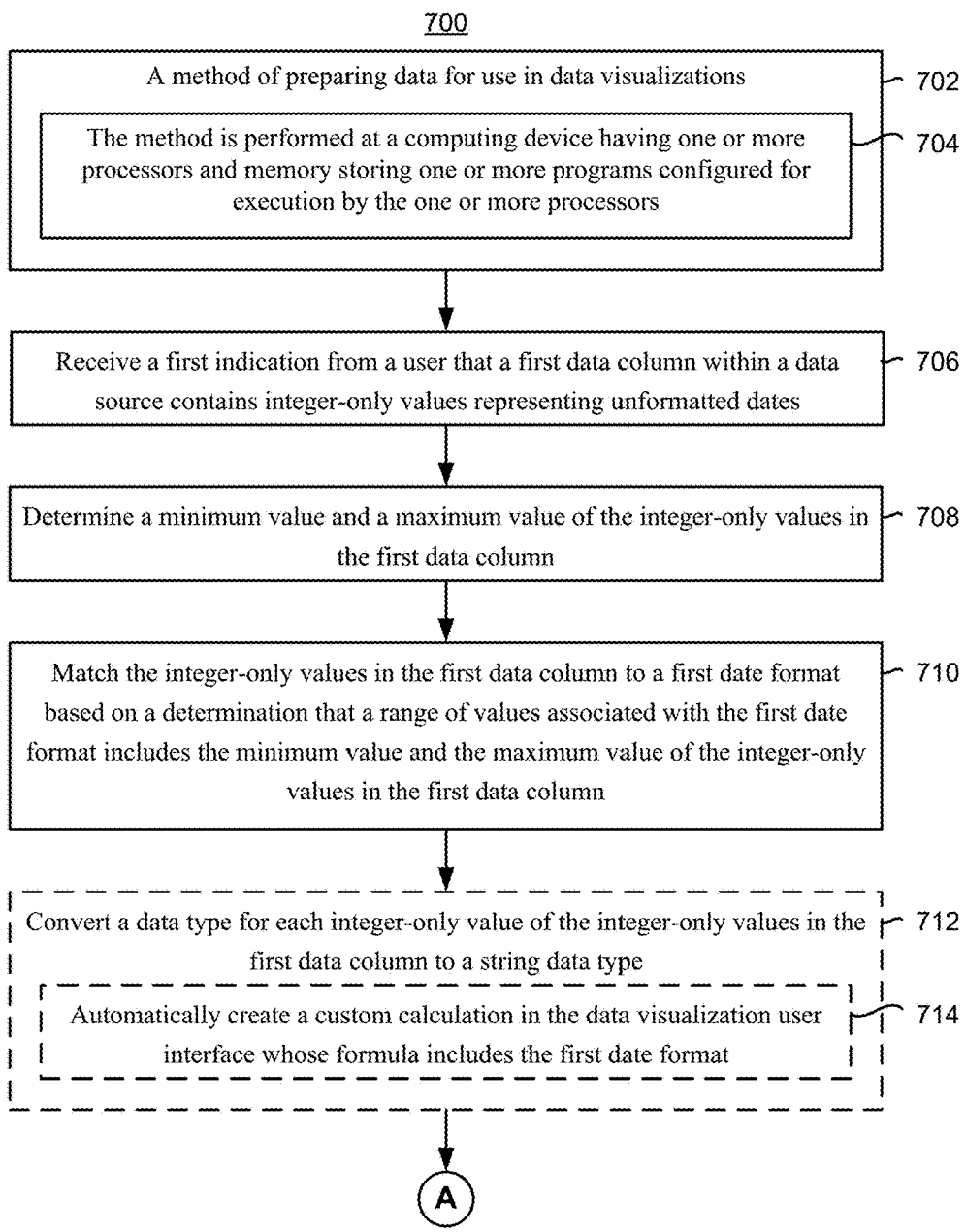
Figure 7C:
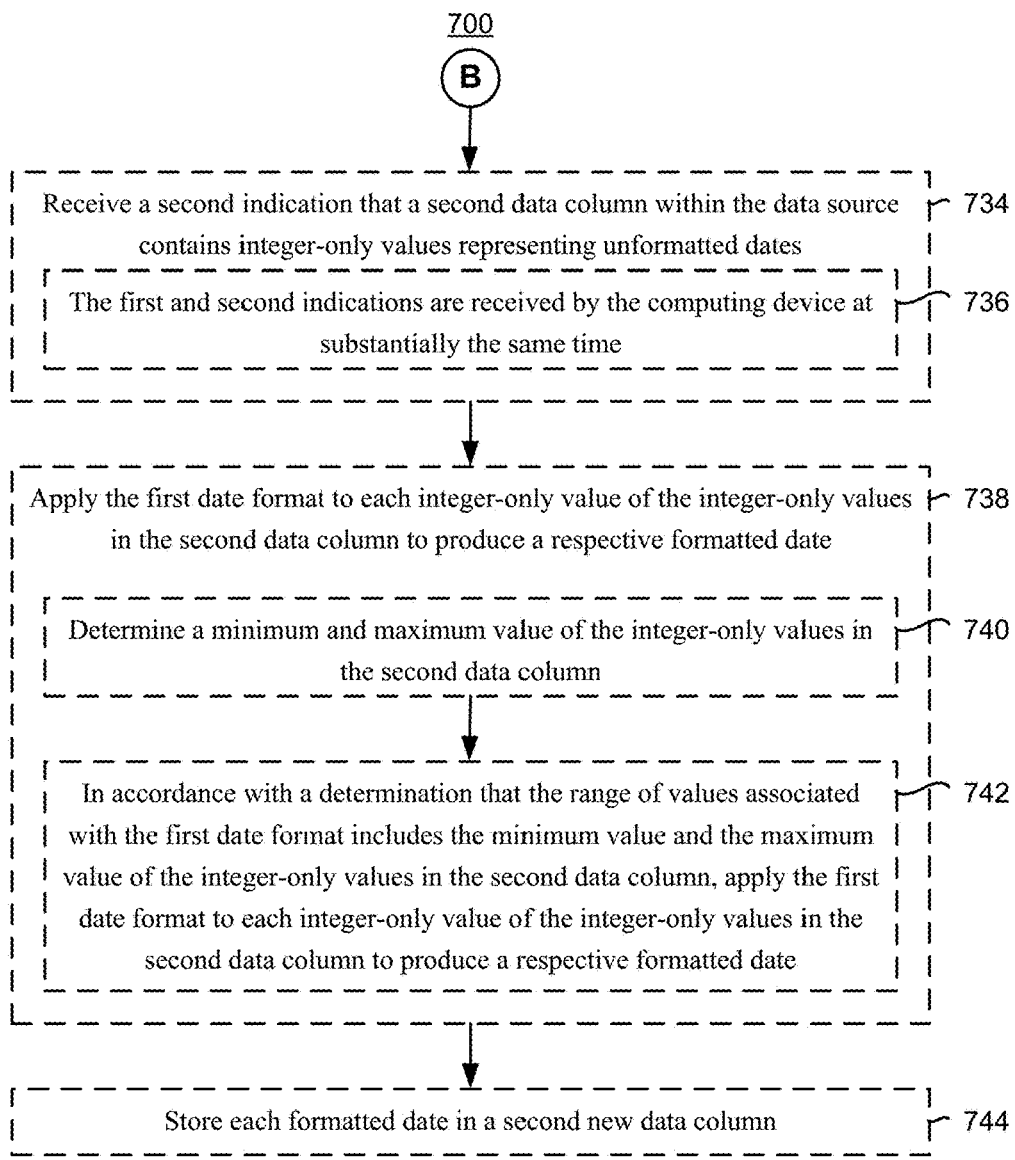

FIGS. 7A-7C provide a flow diagram of a method 700 of preparing raw data for use in data visualizations (702) in accordance with some implementations. The method 700, in accordance with some implementations, is performed (704) at a computing device having one or more processors and memory storing one or more programs configured for execution by the one or more processors. In some implementations, the operations shown in FIGS. 7A-7C correspond to instructions stored in computer memory or other non-transitory computer-readable storage medium (e.g., the memory 214).

As described below, the method 700 provides a fast, intuitive, easy-to-use, and robust way to prepare raw data for use in data visualizations. The method reduces the new learning required of a user of a data visualization application when preparing raw data, thereby creating a more effective and efficient human-machine interface. Furthermore, enabling a user to prepare raw data for use in data visualizations faster and more efficiently allows users to create more sophisticated and detailed data visualizations, thereby allowing users to rely on the data visualizations to make better-informed business decisions.

The computing device 100 receives (706) a first indication from a user that a first data column within a data source contains integer-only values representing unformatted dates. For example, a user provides the first indication by selecting a field name associated with the first data column that is displayed in a data prep user interface (or within the schema information region of a data visualization user interface). In some implementations, the user selects the first data column by right-clicking on a displayed field name associated with the first data column (e.g., the field name "Employee Basic Info" associated with the data column 410-1 of the raw data source 400) and then selecting an option to prepare the data values. For example, the user clicks on a menu option to "prep data" that is displayed in a contextual menu after right-clicking on the displayed field name associated with the first data column.

In some implementations, the computing device determines (708) a minimum value and a maximum value of the integer-only values in the first data column. For example, if the first data column is the data column 414-1 of the raw data source 404, then the computing device would determine (e.g., using the statistics generator 230 or a data preparation API 252 that the minimum value is 90904 and the maximum value is 8082014. In some implementations, when a substantial majority (e.g., 70%, 75%, 80%, 85%, 90%, etc.) of data values in the first data column are integer-only values with a particular number of digits, any data values that contain a different number of digits are sent for error correction processing (e.g., using the data structure analyzer 228 or a data preparation API 252.

For example, the data value 90904, in some implementations, is flagged as erroneous because all other data values in the data column 414-1 have eight digits and only 90904 has fewer digits. In some implementations, this is fixed by changing the data value to 9092004 by analyzing the component date-parts of each data value in the data column 414-1. Because the earliest year component is 1976 the method determines that "2004" is more likely than "1904" and thus converts the value to 9092004. In some implementations, after flagging and fixing erroneous data values, the computing device re-determines the minimum and maximum values (e.g., the computing device 100 re-determines that the minimum value of the data column 414-1 is 9091976 and the maximum value is 8082014). In some implementations, a user can define constant values to use when a data value is flagged as erroneous.

In some implementations, the computing device matches (710) the integer-only values in the first data column to a first date format based on a determination that a range of values associated with the first date format includes the minimum value and the maximum value of the integer-only values in the first data column. In some implementations, the computing device converts (712) each integer-only value in the first data column to a string data type and then automatically creates (714) a custom calculation (e.g., using a DATEPARSE function) whose formula includes the first date format. In this way, a user is relieved of the burden of specifying how to perform the conversion.

In some implementations, the computing device applies (716) the first date format to each integer-only value of the integer-only values in the first data column (e.g., using the data formatter 234) to produce a respective formatted date. In other words, the computing device applies the first date format to each data value and produces one formatted date for each data value. For example, as shown in FIGS. 4C-4D, a date format of "MMddyyyy" is applied to each data value in the data column 414-1 of the raw data source 404 in order to produce one formatted date for each data value. The formatted date is then stored in the data column 416-1 of the prepped data source 406.

In some implementations, applying the first date format includes: (i) selecting (718) a sample of the integer-only values in the first data column (sampling techniques are discussed above) and applying the first date format to each integer-only value within the sample (in other words, the first date format is only applied to a subset of the data values and is not applied to all of the data values in the first data column at this point) of the integer-only values to produce a respective formatted date; (ii) determining (720) whether range and cardinality statistics associated with the first date format describe component date-parts of the formatted dates (e.g., using the statistics generator 230 and the pattern statistics 350 to verify, for example, that each formatted date has a month component date-part with a value between 01-12); and (iii) in accordance with a determination that the range and cardinality statistics associated with the first date format describe component date-parts of the formatted dates, applying (722) the first date format to each integer-only value of the integer-only values in the first data column and storing each formatted date in the first new data column. In this way, the sample is used to verify that the first date format accurately describes the data values contained within the first data column and, after this verification the first date format is then applied to all of the data values in the first data column.

In some implementations, the computing device stores (724) each formatted date in a first new data column in a respective row corresponding to the respective integer-only value. For example, with reference to FIGS. 4C-4D, the data value 1012001 is in the data row 404-1 of the raw data source 400 and the formatted date of 01/01/2001 for this data value is stored in a corresponding row of the prepped data source 406 (in other words, the formatted date is stored in the first row because the corresponding data value from which the formatted date was produced is also stored in the first row).

In some implementations, the computing device displays (726) a schema information region in a data visualization user interface (e.g., the schema information region 510 of data visualization user interface 500). In some implementations, the schema information region includes (728) a field name of the first new data column (e.g., the schema information region 510 of FIG. 5B includes the field name "Region" corresponding to a new data column created during a data preparation operation). In some implementations, the computing device adds a default word to an existing field name for a data column in order to create a field name for the first new data column (e.g., the computing device adds the word "Prepped," such as "Prepped Date #1" for the data column 416-2 in FIG. 4D). In some implementations, the computing device receives (730) user input to assign the field name of the first new data column (e.g., a user types a field name into a dialog box that is displayed in the data visualization user interface 500).

In some implementations, the computing device displays (732) a data visualization in the data visualization user interface including at least one formatted date based on user selection of the field name of the first new data column from the schema information region. For example, the user selects the field name "Prepped Date #1" corresponding to the data column 416-2 of the prepped data source 406 in FIG. 4D and creates a data visualization (e.g., a graph such as the data visualization 502 in FIG. 5B) that includes the formatted dates contained in the data column 416-2).

In some implementations, the computing device receives (734) a second indication that a second data column within the data source contains integer-only values representing unformatted dates. For example, a user selects the field name "Date Approved" corresponding to the data column 414-3 of the raw data source 404, after having already selected the field name "Date #1" corresponding to the data column 414-1. In some implementations, the first and second indications are received by the computing device at substantially the same time (736). For example, the user clicks on the field name "Date #1" and the field name "Date Approved" and then selects a menu option to prepare the data. In some implementations, the user selects a data preparation menu option available in a top-level menu of the data visualization user interface 500 and then selects both field names from a drop-down list.

In some implementations, the computing device applies (738) the first date format to each integer-only value of the integer-only values in the second data column to produce a respective formatted date. In other words, the computing device takes the first date format that was matched to the data values in the first data column and uses it to format data values contained within a different (and unanalyzed) data column (the second data column). In some implementations, before applying the first date format to the integer-only values in the second data column, the computing device: (i) determines (740) a minimum and maximum value of the integer-only values in the second data column; and (ii) in accordance with a determination that the range of values associated with the first date format includes the minimum value and the maximum value of the integer-only values in the second data column, applies (742) the first date format to each integer-only value of the integer-only values in the second data column to produce a respective formatted date. In some implementations, the computing device stores (744) each formatted date in a second new data column. Each formatted date is stored in the same row as the corresponding unformatted date.

It should be understood that the particular order in which the operations in FIGS. 7A-7C have been described is merely exemplary and is not intended to indicate that the described order is the only order in which the operations could be performed. One of ordinary skill in the art would recognize various ways to reorder and/or combine the operations described herein. Additionally, it should be noted that other processes described herein, such as the processes described in FIGS. 6A-6B, can be combined with the processes described in FIGS. 7A-7C.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of preparing data for use in data visualizations, comprising:
    at a computing device having one or more processors and memory storing one or more programs configured for execution by the one or more processors:
        selecting a sample of data values from an existing data column in a data source, wherein the sample includes a plurality of distinct data values;
        identifying a first delimiting location within the sample of data values, wherein identifying the first delimiting location includes:
            identifying a plurality of delimiting locations that includes the first delimiting location; and
            generating statistics describing occurrence of consistent delimiters within the sample of data values, each consistent delimiter comprising one or more non-alphanumeric characters that occur in a same sequence in a substantial majority of the sample of data values;
        creating first new data values and second new data values by splitting each data value in the existing data column at the first identified delimiting location;
        storing the first new data values in a first new data column in the data source and storing the second new data values in a second new data column in the data source;
        assigning field names to the first and second new data columns;
        displaying a schema information region in a data visualization user interface, wherein the schema information region includes field names of data columns in the data source, including the assigned field names of the first and second new data columns; and
        displaying a data visualization in the data visualization user interface including one or more of the first new data values based on user selection of the assigned field name of the first new data column from the schema information region.

2. The method of claim 1, further comprising: assigning a first data type to the first new data column and a second data type to the second new data column, wherein the first data type is distinct from the second data type.

3. The method of claim 2, wherein the first data type is a date data type and the method further comprises for each first new data value in the first new data column, identifying component date-parts using range and cardinality statistics.

4. The method of claim 1, wherein assigning field names to the first and second new data columns includes receiving user input to assign field names to the first and second new data columns.

5. The method of claim 1, wherein assigning field names to the first and second new data columns includes automatically assigning default field names to the first and second new data columns based on metadata associated with the first and second new data values, respectively.

6. The method of claim 5, further comprising: modifying at least one of the assigned default field names based on user input.

7. A computing device, comprising:
    one or more processors;
    memory; and
    one or more programs stored in the memory for execution by the one or more processors, the one or more programs comprising instructions for:
        selecting a sample of data values from an existing data column in a data source, wherein the sample includes a plurality of distinct data values;
        identifying a first delimiting location within the sample of data values, wherein identifying the first delimiting location includes:
            identifying a plurality of delimiting locations that includes the first delimiting location; and
            generating statistics describing occurrence of consistent delimiters within the sample of data values, each consistent delimiter comprising one or more non-alphanumeric characters that occur in a same sequence in a substantial majority of the sample of data values;
        creating first new data values and second new data values by splitting each data value in the existing data column at the first identified delimiting location;
        storing the first new data values in a first new data column in the data source and storing the second new data values in a second new data column in the data source;
        assigning field names to the first and second new data columns;
        displaying a schema information region in a data visualization user interface, wherein the schema information region includes field names of data columns in the data source, including the assigned field names of the first and second new data columns; and
        displaying a data visualization in the data visualization user interface including one or more of the first new data values based on user selection of the assigned field name of the first new data column from the schema information region.

8. A method of preparing data for use in data visualizations, comprising:
    at a computing device having one or more processors and memory storing one or more programs configured for execution by the one or more processors:
        receiving a first indication from a user that a first data column within a data source contains integer-only values representing unformatted dates;
        determining a minimum value and a maximum value of the integer-only values in the first data column;
        matching the integer-only values in the first data column to a first date format based on a determination that a range of values associated with the first date format includes the minimum value and the maximum value of the integer-only values in the first data column;

selecting a sample of the integer-only values in the first data column and applying the first date format to each integer-only value within the sample of the integer-only values to produce a respective formatted date;

applying the first date format to each integer-only value of the integer-only values in the first data column to produce a respective formatted date;

storing, in the data source, each formatted date in a first new data column in a respective row corresponding to the respective integer-only value;

displaying a schema information region in a data visualization user interface, wherein the schema information region includes a field name of the first new data column; and displaying a data visualization in the data visualization user interface including at least one formatted date based on user selection of the field name of the first new data column from the schema information region.

9. The method of claim 8, wherein applying the first date format to each integer-only value of the integer-only values in the first data column includes:

determining whether range and cardinality statistics associated with the first date format describe component date-parts of the formatted dates; and in accordance with a determination that the range and cardinality statistics associated with the first date format describe component date-parts of the formatted dates, applying the first date format to each integer-only value of the integer-only values in the first data column and storing each formatted date in the first new data column.

10. The method of claim 8, further comprising:

receiving a second indication that a second data column within the data source contains integer-only values representing unformatted dates;

applying the first date format to each integer-only value of the integer-only values in the second data column to produce a respective formatted date; and storing each formatted date in a second new data column in the data source.

11. The method of claim 10, wherein applying the first date format to each integer-only value of the integer-only values in the second data column includes:

determining a minimum value and a maximum value of the integer-only values in the second data column; and in accordance with a determination that the range of values associated with the first date format includes the minimum value and the maximum value of the integer-only values in the second data column, applying the first date format to each integer-only value of the integer-only values in the second data column to produce a respective formatted date.

12. The method of claim 10, wherein the first and second indications are received by the computing device at substantially the same time.

13. The method of claim 8, further comprising:

receiving user input to assign the field name of the first new data column.

14. The method of claim 8, further comprising:

before applying the first date format to each integer-only value of the integer-only values in the first data column, converting each integer-only value of the integer-only values in the first data column to a string data type.

15. The method of claim 14, further comprising:

creating a custom calculation in the data visualization user interface whose formula includes the first date format.

16. A computing device, comprising:

one or more processors;

memory; and one or more programs stored in the memory for execution by the one or more processors, the one or more programs comprising instructions for:

receiving a first indication from a user that a first data column within a data source contains integer-only values representing unformatted dates;

determining a minimum value and a maximum value of the integer-only values in the first data column;

matching the integer-only values in the first data column to a first date format based on a determination that a range of values associated with the first date format includes the minimum value and the maximum value of the integer-only values in the first data column;

selecting a sample of the integer-only values in the first data column and applying the first date format to each integer-only value within the sample of the integer-only values to produce a respective formatted date;

applying the first date format to each integer-only value of the integer-only values in the first data column to produce a respective formatted date;

storing, in the data source, each formatted date in a first new data column in a respective row corresponding to the respective integer-only value;

displaying a schema information region in a data visualization user interface, wherein the schema information region includes a field name of the first new data column; and displaying a data visualization in the data visualization user interface including at least one formatted date based on user selection of the field name of the first new data column from the schema information region.

17. The computing device of claim 16, wherein the one or more programs further comprise instructions for:

receiving a second indication that a second data column within the data source contains integer-only values representing unformatted dates;

applying the first date format to each integer-only value of the integer-only values in the second data column to produce a respective formatted date; and storing each formatted date in a second new data column in the data source.

18. The computing device of claim 7, wherein the one or more programs further comprise instructions for assigning a first data type to the first new data column and a second data type to the second new data column, wherein the first data type is distinct from the second data type.

19. The computing device of claim 18, wherein the first data type is a date data type and the one or more programs further comprise instructions for:

for each first new data value in the first new data column, identifying component date-parts using range and cardinality statistics.

20. The computing device of claim 7, wherein the instructions for assigning field names to the first and second new data columns comprise instructions for receiving user input to assign field names to the first and second new data columns.

21. The computing device of claim 7, wherein the instructions for assigning field names to the first and second new data columns comprise instructions for automatically assigning default field names to the first and second new data columns based on metadata associated with the first and second new data values, respectively.

22. The computing device of claim 21, wherein the one or more programs further comprise instructions for modifying at least one of the assigned default field names based on user input.

23. The computing device of claim 16, wherein the instructions for applying the first date format to each integer-only value of the integer-only values in the first data column comprise instructions for:
  determining whether range and cardinality statistics associated with the first date format describe component date-parts of the formatted dates; and
  in accordance with a determination that the range and cardinality statistics associated with the first date format describe component date-parts of the formatted dates, applying the first date format to each integer-only value of the integer-only values in the first data column and storing each formatted date in the first new data column.

24. The computing device of claim 17, wherein the instructions for applying the first date format to each integer-only value of the integer-only values in the second data column includes instructions for:
  determining a minimum value and a maximum value of the integer-only values in the second data column; and
  in accordance with a determination that the range of values associated with the first date format includes the minimum value and the maximum value of the integer-only values in the second data column, applying the first date format to each integer-only value of the integer-only values in the second data column to produce a respective formatted date.

25. The computing device of claim 17, wherein the first and second indications are received by the computing device at substantially the same time.

26. The computing device of claim 16, wherein the one or more programs further comprise instructions for receiving user input to assign the field name of the first new data column.

27. The computing device of claim 16, wherein the one or more programs further comprise instructions for:
  before applying the first date format to each integer-only value of the integer-only values in the first data column, converting each integer-only value of the integer-only values in the first data column to a string data type.

28. The computing device of claim 27, wherein the one or more programs further comprise instructions for creating a custom calculation in the data visualization user interface whose formula includes the first date format.

* * * * *